US011521581B2

(12) United States Patent
Burns et al.

(10) Patent No.: US 11,521,581 B2
(45) Date of Patent: Dec. 6, 2022

(54) CONTROLLING DISPLAYS

(71) Applicant: Apple Inc., Cupertino, CA (US)

(72) Inventors: Aaron Mackay Burns, Sunnyvale, CA (US); Alexis H. Palangie, Palo Alto, CA (US); Pol Pla I Conesa, Belmont, CA (US); David M. Schattel, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/397,734

(22) Filed: Aug. 9, 2021

(65) Prior Publication Data

US 2021/0366440 A1    Nov. 25, 2021

Related U.S. Application Data

(63) Continuation of application No. PCT/US2020/048845, filed on Aug. 31, 2020.

(60) Provisional application No. 63/058,238, filed on Jul. 29, 2020, provisional application No. 62/906,465, filed on Sep. 26, 2019.

(51) Int. Cl.
*G09G 5/373* (2006.01)
*G06F 1/16* (2006.01)
*G06T 19/00* (2011.01)

(52) U.S. Cl.
CPC ............ *G09G 5/373* (2013.01); *G06F 1/163* (2013.01); *G06T 19/006* (2013.01); *G09G 2340/045* (2013.01); *G09G 2360/04* (2013.01)

(58) Field of Classification Search
None
See application file for complete search history.

(56) References Cited

U.S. PATENT DOCUMENTS

| | | | |
|---|---|---|---|
| 8,994,721 B2 * | 3/2015 | Matsuda | G06F 3/04815 345/419 |
| 9,411,412 B1 | 8/2016 | Jain et al. | |
| 9,459,692 B1 | 10/2016 | Li | |
| 9,665,249 B1 | 5/2017 | Ding et al. | |
| 10,403,043 B2 | 9/2019 | Kaufman et al. | |
| 2001/0044858 A1 | 11/2001 | Rekimoto | |
| 2012/0124509 A1 | 5/2012 | Matsuda et al. | |
| 2012/0249741 A1 | 10/2012 | Maciocci et al. | |
| 2013/0007672 A1 | 1/2013 | Taubman | |
| 2014/0225919 A1 | 8/2014 | Kaino et al. | |
| 2014/0282220 A1 | 9/2014 | Wantland et al. | |
| 2014/0375680 A1 | 12/2014 | Ackerman et al. | |

(Continued)

FOREIGN PATENT DOCUMENTS

| | | |
|---|---|---|
| CN | 103765366 A | 4/2014 |
| CN | 104115100 A | 10/2014 |

(Continued)

OTHER PUBLICATIONS

Final Office Action received for U.S. Appl. No. 16/552,549, dated Dec. 3, 2021, 16 pages.

(Continued)

*Primary Examiner* — Jwalant Amin
(74) *Attorney, Agent, or Firm* — Dentons US LLP

(57) ABSTRACT

In accordance with some embodiments, an exemplary process for dynamically controlling the size of a display based on a moving of a visual object meeting a criterion in a computer-generated reality (CGR) environment is described.

22 Claims, 31 Drawing Sheets

(56) References Cited

U.S. PATENT DOCUMENTS

| | | | |
|---|---|---|---|
| 2015/0009132 | A1 | 1/2015 | Kuriya et al. |
| 2015/0213650 | A1 | 7/2015 | Barzuza et al. |
| 2015/0215351 | A1 | 7/2015 | Barzuza et al. |
| 2015/0235267 | A1 | 8/2015 | Steube et al. |
| 2015/0302867 | A1 | 10/2015 | Tomlin et al. |
| 2016/0026242 | A1 | 1/2016 | Burns et al. |
| 2016/0027216 | A1 | 1/2016 | Da Veiga et al. |
| 2016/0148433 | A1 | 5/2016 | Petrovskaya et al. |
| 2016/0217614 | A1 | 7/2016 | Kraver et al. |
| 2017/0061696 | A1 | 3/2017 | Li et al. |
| 2017/0092235 | A1 | 3/2017 | Osman et al. |
| 2017/0123489 | A1 | 5/2017 | Guenter |
| 2017/0123491 | A1 | 5/2017 | Hansen et al. |
| 2017/0185148 | A1 | 6/2017 | Kondo |
| 2017/0203213 | A1 | 7/2017 | Stafford |
| 2017/0232335 | A1 | 8/2017 | Williams et al. |
| 2017/0256096 | A1 | 9/2017 | Faaborg et al. |
| 2017/0263056 | A1 | 9/2017 | Leppanen et al. |
| 2017/0344127 | A1 | 11/2017 | Hu et al. |
| 2018/0095607 | A1 | 4/2018 | Proctor |
| 2018/0286126 | A1 | 10/2018 | Schwarz et al. |
| 2018/0350119 | A1 | 12/2018 | Kocharlakota et al. |
| 2019/0107721 | A1 | 4/2019 | Scott et al. |
| 2019/0227763 | A1 | 7/2019 | Kaufthal |
| 2019/0272138 | A1 | 9/2019 | Krauss et al. |
| 2020/0020162 | A1 | 1/2020 | Jones et al. |
| 2020/0089313 | A1 | 3/2020 | Himane |
| 2020/0103962 | A1 | 4/2020 | Burns |
| 2020/0193938 | A1* | 6/2020 | Estruch Tena ..... G02B 27/0172 |
| 2020/0219469 | A1* | 7/2020 | Mittal ..................... G09G 5/14 |
| 2020/0293177 | A1 | 9/2020 | Iglesias |
| 2021/0084259 | A1 | 3/2021 | Kies et al. |
| 2021/0368136 | A1 | 11/2021 | Chalmers et al. |

FOREIGN PATENT DOCUMENTS

| | | |
|---|---|---|
| CN | 105431763 A | 3/2016 |
| CN | 106716302 A | 5/2017 |
| CN | 108136258 A | 6/2018 |
| EP | 3039555 A1 | 7/2016 |
| WO | 2015/140106 A1 | 9/2015 |
| WO | 2016/014872 A1 | 1/2016 |
| WO | 2016/073986 A1 | 5/2016 |
| WO | 2017/171943 A1 | 10/2017 |

OTHER PUBLICATIONS

Zinchenko et al., "Virtual Reality Control of a Robotic Camera Holder for Minimally Invasive Surgery", 2017 11th Asian Control Conference (ASCC) Gold Coast Convention Centre, Australia, Dec. 17-20, 2017, 6 pages.

Applicant-Initiated Interview Summary received for U.S. Appl. No. 16/552,549, dated Mar. 25, 2021, 3 pages.

Applicant-Initiated Interview Summary received for U.S. Appl. No. 16/552,549, dated Sep. 3, 2021, 4 pages.

Corrected Notice of Allowance received for U.S. Appl. No. 16/651,249, dated Feb. 18, 2021, 2 pages.

Dedual et al., "Creating hybrid user interfaces with a 2D multi-touch tabletop and a 3D see-through head-worn display", IEEE International Symposium on Mixed and Augmented Reality 2011 Science and Technology Proceedings, Oct. 26-29, 2011, 2 pages.

Fitzmaurice et al., "Bricks: Laying the Foundations for Graspable User interfaces", May 7-11, 1995, pp. 442-449.

International Preliminary Report on Patentability received for PCT Patent Application No. PCT/US2018/052748, dated Apr. 9, 2020, 11 pages.

International Search Report and Written Opinion Received for PCT Application No. PCT/US2018/052748, dated Dec. 14, 2018, 12 pages.

International Search Report and Written Opinion received for PCT Patent Application No. PCT/US2020/048845, dated Feb. 1, 2021, 20 pages.

International Search Report and Written Opinion received for PCT Patent Application No. PCT/US2020/052886, dated Feb. 1, 2021, 22 pages.

Invitation to Pay Additional Fees received for PCT Patent Application No. PCT/US2020/048845, dated Dec. 4, 2020, 13 pages.

Invitation to Pay Additional Fees received for PCT Patent Application No. PCT/US2020/052886, dated Dec. 9, 2020, 15 pages.

Non-Final Office Action received for U.S. Appl. No. 16/552,549, dated Jun. 29, 2021, 15 pages.

Non-Final Office Action received for U.S. Appl. No. 16/552,549, dated Nov. 12, 2020, 15 pages.

Notice of Allowance received for U.S. Appl. No. 16/651,249, dated Jan. 27, 2021, 11 pages.

Piekarski et al., "Integrating Virtual and Augmented Realities in an Outdoor Application", IEEE, Feb. 1999, 10 pages.

Regenbrecht et al., "A tangible AR desktop environment", Computers & Graphics, vol. 25, No. 5, Oct. 2001, pp. 755-763.

Shaer et al., "Tangible User Interfaces: Past, Present, and Future Directions", Foundations and Trends? in Human-Computer Interaction, vol. 3, No. 1-2, 2009, pp. 1-137.

The Dynamic Desktop (in the office of the future . . . )—YouTube, Online Available at: https://www.youtube.com/watch?v=m9IZfnRrM4Y, Aug. 20, 2014, 2014, 1 page.

Office Action received for Chinese Patent Application No. 201910868273.0, dated Sep. 24, 2021, 24 pages (12 pages of English Translation and 12 pages of Official Copy).

Applicant-Initiated Interview Summary received for U.S. Appl. No. 16/552,549, dated Jan. 26, 2022, 4 pages.

Corrected Notice of Allowance received for U.S. Appl. No. 16/552,549, dated Mar. 3, 2022, 6 pages.

Notice of Allowance received for Chinese Patent Application No. 201910868273.0, dated Feb. 8, 2022, 4 pages (1 page of English Translation and 3 pages of Official Copy).

Notice of Allowance received for U.S. Appl. No. 16/552,549, dated Feb. 24, 2022, 10 pages.

Non-Final Office Action received for U.S. Appl. No. 17/397,726, dated May 12, 2022, 9 pages.

Corrected Notice of Allowance received for U.S. Appl. No. 16/552,549, dated Mar. 31, 2022, 3 pages.

International Preliminary Report on Patentability received for PCT Patent Application No. PCT/US2020/048845, dated Apr. 7, 2022, 14 pages.

International Preliminary Report on Patentability received for PCT Patent Application No. PCT/US2020/052886, dated Apr. 7, 2022, 15 pages.

* cited by examiner

CONTROLLING DISPLAYS

CROSS-REFERENCE TO RELATED APPLICATIONS

This application is continuation of PCT/US2020/048845, entitled "CONTROLLING DISPLAYS," filed Aug. 31, 2020, which claims priority to U.S. Provisional Patent Application Ser. No. 63/058,238, entitled "CONTROLLING DISPLAYS IN A COMPUTER-GENERATED REALITY ENVIRONMENT," filed on Jul. 29, 2020, and U.S. Provisional Patent Application Ser. No. 62/906,465, entitled "DYNAMICALLY CONTROLLING THE SIZE OF DISPLAYS IN A COMPUTER-GENERATED REALITY ENVIRONMENT," filed on Sep. 26, 2019. The contents of the aforementioned applications are hereby incorporated by reference in their entireties.

FIELD

The present disclosure relates generally to computer-generated reality environments, and more specifically to dynamically controlling displays in a computer-generated reality environment.

BACKGROUND

Computer-generated reality environments are environments where at least some objects displayed for a user's viewing are generated by a computer. In some uses, a user may interact with a representation of a physical display within the computer-generated reality environment. However, there is a lack of robust functionality for dynamically controlling the size of displays within computer-generated reality environments. In addition, there is a lack of functionality for controlling the display of representations within computer-generated reality environments.

Furthermore, in current systems, there is a lack of functionality for controlling a display of user interface elements based on a gaze within computer-generated reality environments. Further still, existing systems lack functionality for controlling the displaying of a virtual display window based on a hinge angle of a physical device within computer-generated reality environments.

BRIEF SUMMARY

In accordance with some embodiments, a method includes presenting, via a display of a wearable electronic device, a representation of a physical display within a computer-generated reality (CGR) environment, wherein the representation of the physical display includes a first display area; displaying, via the display of the wearable electronic device, a visual object at a first location within the first display area of the representation of the physical display; receiving a request to move the visual object to a second location within the CGR environment; and in response to receiving the request, displaying, via the display of the wearable electronic device, an expanded display area of the representation of the physical display when the second location meets a criterion, wherein the expanded display area includes at least a portion of the first display area and a second display area, wherein the second display area is sized to accommodate, at least, the visual object at the second location.

In accordance with some embodiments, a wearable electronic device includes a display, one or more processors, and memory storing one or more programs configured to be executed by the one or more processors, the one or more programs including instructions for: presenting, via the display, a representation of a physical display within a CGR environment, where the representation of the physical display includes a first display area; displaying, via the display, a visual object at a first location within the first display area of the representation of the physical display; receiving a request to move the visual object to a second location within the CGR environment; and in response to receiving the request, displaying, via the display, an expanded display area of the representation of the physical display when the second location meets a criterion, wherein the expanded display area includes at least a portion of the first display area and a second display area, wherein the second display area is sized to accommodate, at least, the visual object at the second location.

In accordance with some embodiments, a non-transitory computer-readable storage medium storing one or more programs configured to be executed by one or more processors of a wearable electronic device including a display, the one or more programs including instructions for: presenting, via the display, a representation of a physical display within a CGR environment, where the representation of the physical display includes a first display area; displaying, via the display, a visual object at a first location within the first display area of the representation of the physical display; receiving a request to move the visual object to a second location within the CGR environment; and in response to receiving the request, displaying, via the display, an expanded display area of the representation of the physical display when the second location meets a criterion, wherein the expanded display area includes at least a portion of the first display area and a second display area, wherein the second display area is sized to accommodate, at least, the visual object at the second location.

In accordance with some embodiments, a transitory computer-readable storage medium storing one or more programs configured to be executed by one or more processors of a wearable electronic device including a display, the one or more programs including instructions for: presenting, via the display, a representation of a physical display within a CGR environment, where the representation of the physical display includes a first display area; displaying, via the display, a visual object at a first location within the first display area of the representation of the physical display; receiving a request to move the visual object to a second location within the CGR environment; and in response to receiving the request, displaying, via the display, an expanded display area of the representation of the physical display when the second location meets a criterion, wherein the expanded display area includes at least a portion of the first display area and a second display area, wherein the second display area is sized to accommodate, at least, the visual object at the second location.

In accordance with some embodiments, a wearable electronic device includes a display, and means for presenting, via the display, a representation of a physical display within a CGR environment, where the representation of the physical display includes a first display area, means for displaying, via the display, a visual object at a first location within the first display area of the representation of the physical display, means for receiving a request to move the visual object to a second location within the CGR environment, and means for, in response to receiving the request, displaying, via the display, an expanded display area of the representation of the physical display when the second location meets a criterion, wherein the expanded display area includes at least a portion of the first display area and a second display area, wherein the second display area is sized to accommodate, at least, the visual object at the second location.

In accordance with some embodiments, a method comprises: displaying, via a display of a wearable electronic device, a virtual display area representing a physical display within a CGR environment; displaying, in a first region, a first representation of an area for displaying system elements; and while the first representation of the area for displaying system elements is not selected: detecting an event in a second region of the virtual display area, wherein the second region is outside of the first region; and when a determination is made that the event meets movement criteria, displaying a second representation of the area for displaying system elements in the second region.

In accordance with some embodiments, a wearable electronic device includes a display, one or more processors, and memory storing one or more programs configured to be executed by the one or more processors, the one or more programs including instructions for: displaying, via a display of a wearable electronic device, a virtual display area representing a physical display within a CGR environment; displaying, in a first region, a first representation of an area for displaying system elements; and while the first representation of the area for displaying system elements is not selected: detecting an event in a second region of the virtual display area, wherein the second region is outside of the first region; and when a determination is made that the event meets movement criteria, displaying a second representation of the area for displaying system elements in the second region.

In accordance with some embodiments, a non-transitory computer-readable storage medium storing one or more programs configured to be executed by one or more processors of a wearable electronic device including a display, the one or more programs including instructions for: displaying, via a display of a wearable electronic device, a virtual display area representing a physical display within a CGR environment; displaying, in a first region, a first representation of an area for displaying system elements; and while the first representation of the area for displaying system elements is not selected: detecting an event in a second region of the virtual display area, wherein the second region is outside of the first region; and when a determination is made that the event meets movement criteria, displaying a second representation of the area for displaying system elements in the second region.

In accordance with some embodiments, a transitory computer-readable storage medium storing one or more programs configured to be executed by one or more processors of a wearable electronic device including a display, the one or more programs including instructions for: displaying, via a display of a wearable electronic device, a virtual display area representing a physical display within a CGR environment; displaying, in a first region, a first representation of an area for displaying system elements; and while the first representation of the area for displaying system elements is not selected: detecting an event in a second region of the virtual display area, wherein the second region is outside of the first region; and when a determination is made that the event meets movement criteria, displaying a second representation of the area for displaying system elements in the second region.

In accordance with some embodiments, a wearable electronic device includes a display, and means for displaying, via the display, a virtual display area representing a physical display within a CGR environment; means for displaying, via a display of a wearable electronic device, a virtual display area representing a physical display within a CGR environment; means for displaying, in a first region, a first representation of an area for displaying system elements; and means, while the first representation of the area for displaying system elements is not selected, for: detecting an event in a second region of the virtual display area, wherein the second region is outside of the first region; and when a determination is made that the event meets movement criteria, displaying a second representation of the area for displaying system elements in the second region.

In accordance with some embodiments, a method comprises, at a wearable electronic device configured to facilitate presenting a CGR environment: obtaining data representative of a hinge angle of a physical object; and in response to obtaining the data representative of the hinge angle of the physical object: displaying, via a display of the wearable electronic device, a virtual display window relative to the physical device when a determination is made that the hinge angle exceeds a threshold hinge angle.

In accordance with some embodiments, a wearable electronic device includes a display, one or more processors, and memory storing one or more programs configured to be executed by the one or more processors, the one or more programs including instructions for: obtaining data representative of a hinge angle of a physical object; and in response to obtaining the data representative of the hinge angle of the physical object: displaying, via the display, a virtual display window relative to the physical device when a determination is made that the hinge angle exceeds a threshold hinge angle.

In accordance with some embodiments, a non-transitory computer-readable storage medium storing one or more programs configured to be executed by one or more processors of a wearable electronic device including a display, the one or more programs including instructions for: obtaining data representative of a hinge angle of a physical object; and in response to obtaining the data representative of the hinge angle of the physical object: displaying, via the display, a virtual display window relative to the physical device when a determination is made that the hinge angle exceeds a threshold hinge angle.

In accordance with some embodiments, a transitory computer-readable storage medium storing one or more programs configured to be executed by one or more processors of a wearable electronic device including a display, the one or more programs including instructions for: obtaining data representative of a hinge angle of a physical object; and in response to obtaining the data representative of the hinge angle of the physical object: displaying, via the display, a virtual display window relative to the physical device when a determination is made that the hinge angle exceeds a threshold hinge angle.

In accordance with some embodiments, a wearable electronic device includes a display, and means for obtaining data representative of a hinge angle of a physical object; and in response to obtaining the data representative of the hinge angle of the physical object: displaying, via the display, a virtual display window relative to the physical device when a determination is made that the hinge angle exceeds a threshold hinge angle.

In accordance with some embodiments, a method comprises: displaying, via a display of a wearable electronic device, a user interface (UI) element at a first position within a CGR environment; detecting a current gaze of the user within the CGR environment; determining, based on the current gaze of the user, a second position within the CGR environment, wherein the second position is different from the first position; receiving a request to move the UI element; in response to determining that the request meets a movement criteria, displaying the UI element at a third position within the CGR environment, wherein the third position is different from the first position and the second position; and in response to displaying the UI element at the third position, moving, in accordance with the request, the UI element to the second position.

In accordance with some embodiments, a wearable electronic device includes a display, one or more processors, and memory storing one or more programs configured to be executed by the one or more processors, the one or more programs including instructions for: displaying, via the display, a UI element at a first position within a CGR environment; detecting a current gaze of the user within the CGR environment; determining, based on the current gaze of the user, a second position within the CGR environment, wherein the second position is different from the first position; receiving a request to move the UI element; in response to determining that the request meets a movement criteria, displaying the UI element at a third position within the CGR environment, wherein the third position is different from the first position and the second position; and in response to displaying the UI element at the third position, moving, in accordance with the request, the UI element to the second position.

In accordance with some embodiments, a non-transitory computer-readable storage medium storing one or more programs configured to be executed by one or more processors of a wearable electronic device including a display, the one or more programs including instructions for: displaying, via the display, a UI element at a first position within a CGR environment; detecting a current gaze of the user within the CGR environment; determining, based on the current gaze of the user, a second position within the CGR environment, wherein the second position is different from the first position; receiving a request to move the UI element; in response to determining that the request meets a movement criteria, displaying the UI element at a third position within the CGR environment, wherein the third position is different from the first position and the second position; and in response to displaying the UI element at the third position, moving, in accordance with the request, the UI element to the second position.

In accordance with some embodiments, a transitory computer-readable storage medium storing one or more programs configured to be executed by one or more processors of a wearable electronic device including a display, the one or more programs including instructions for: displaying, via the display, a UI element at a first position within a CGR environment; detecting a current gaze of the user within the CGR environment; determining, based on the current gaze of the user, a second position within the CGR environment, wherein the second position is different from the first position; receiving a request to move the UI element; in response to determining that the request meets a movement criteria, displaying the UI element at a third position within the CGR environment, wherein the third position is different from the first position and the second position; and in response to displaying the UI element at the third position, moving, in accordance with the request, the UI element to the second position.

In accordance with some embodiments, a wearable electronic device includes a display, and means for displaying, via the display, a UI element at a first position within a CGR environment; detecting a current gaze of the user within the CGR environment; determining, based on the current gaze of the user, a second position within the CGR environment, wherein the second position is different from the first position; receiving a request to move the UI element; in response to determining that the request meets a movement criteria, displaying the UI element at a third position within the CGR environment, wherein the third position is different from the first position and the second position; and in response to displaying the UI element at the third position, moving, in accordance with the request, the UI element to the second position.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

BRIEF DESCRIPTION OF THE FIGURES

In the following description, reference is made to the accompanying figures which form a part thereof, and which illustrate several examples of the present disclosure. It is understood that other examples may be utilized and structural and operational changes may be made without departing from the scope of the present disclosure. The use of the same reference symbols in different figures indicates similar or identical items.

DESCRIPTION

Figure 1A:
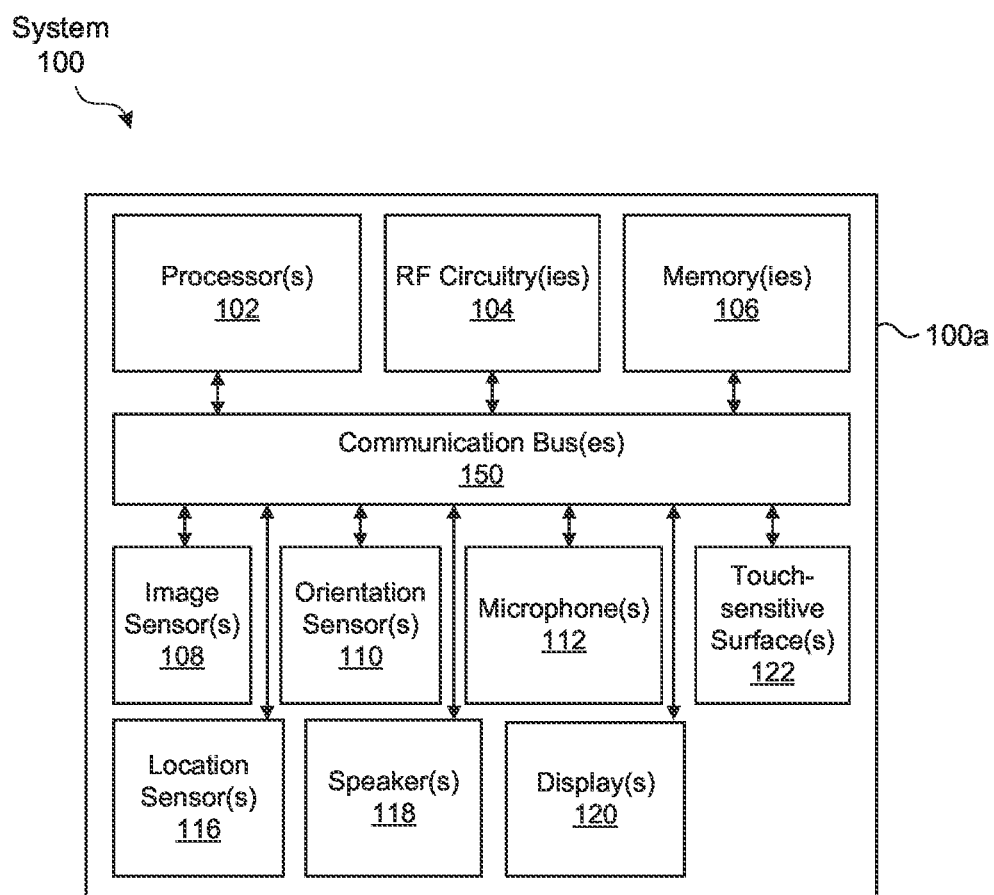
FIGS. 1A-1B depict exemplary systems for use in various CGR technologies.

Various examples of electronic systems and techniques for using such systems in relation to various CGR technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a CGR environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of MR include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
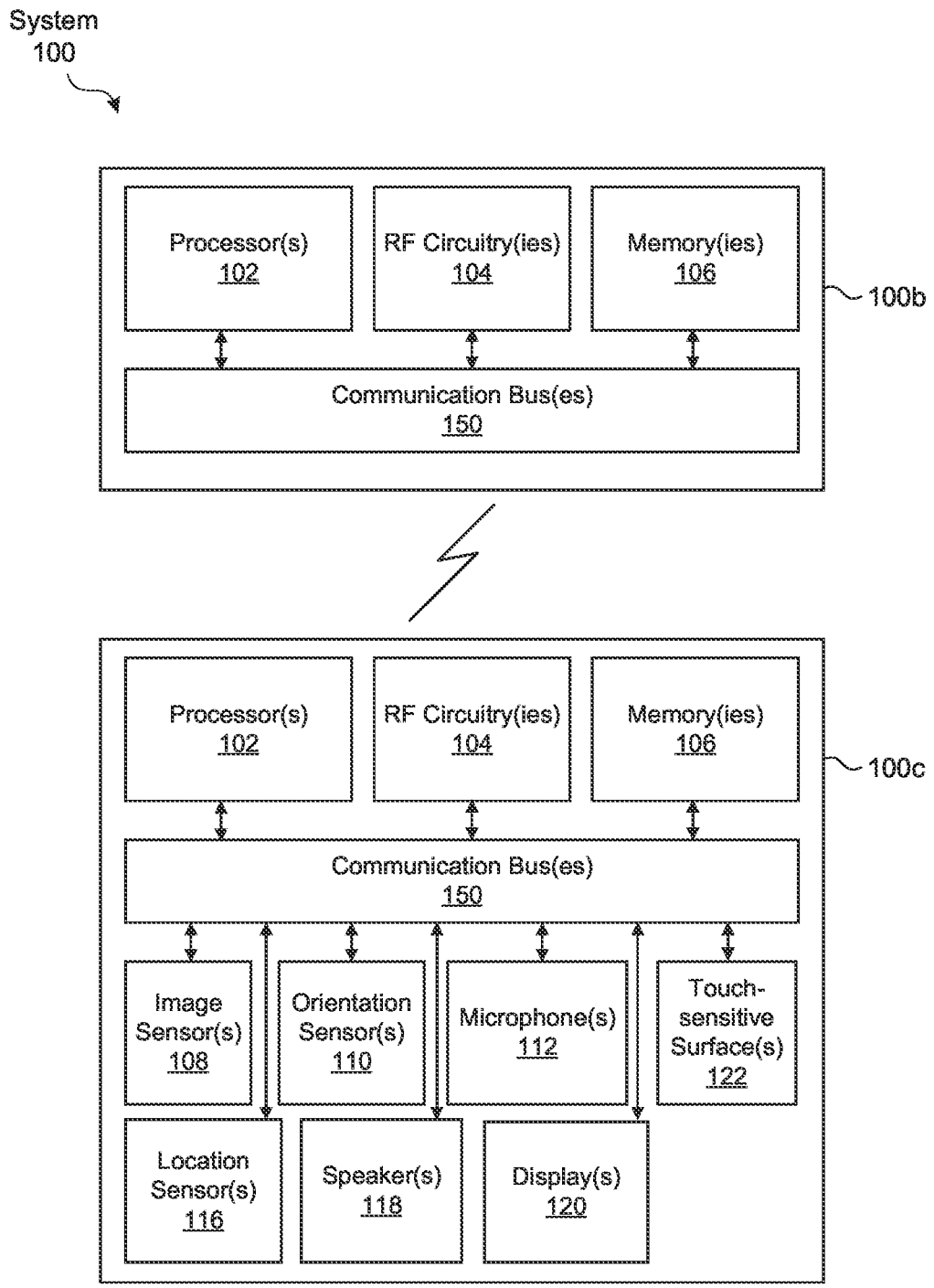

FIG. 1A and FIG. 1B depict exemplary system 100 for use in various CGR technologies.

In some examples, as illustrated in FIG. 1A, system 100 includes device 100*a*. Device 100*a* includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*a*.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100*a* is implemented in a base station device or a HMD device.

As illustrated in FIG. 1B, in some examples, system 100 includes two (or more) devices in communication, such as through a wired connection or a wireless connection. First device 100*b* (e.g., a base station device) includes processor(s) 102, RF circuitry(ies) 104, and memory(ies) 106. These components optionally communicate over communication bus(es) 150 of device 100*b*. Second device 100*c* (e.g., a HMD) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*c*.

In some examples, system 100 is a mobile device. In some examples, system 100 is an HMD device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Various aspects of the present disclosure are directed to systems and techniques that provide functionality for controlling displays (e.g., virtual displays) within a CGR environment.

In particular, aspects of the present disclosure are directed to systems and techniques that provide functionality to dynamically control the size of a display in a CGR environment. In some aspects, controlling the size of a display may include controlling a resizing of the display. The systems and techniques described herein allow for expanding and/or contracting a representation of a display in a CGR environment, for example in response to a moving of a visual object meeting a resizing criterion. Throughout this disclosure, resizing may be used to refer collectively to the expansion and/or contraction of the representation of a display within a CGR. As shown in embodiments described below, expansion of the representation of a display may be performed virtually, in which the expanded representation of the display may include at least an area or portion that is a computer-generated display area. As also shown in embodiments described below, contraction of the representation of a display may be performed virtually, in which contracting the representation of a display may include ceasing to display at least an area or portion of a computer-generated display area (e.g., a portion of the expanded display area) and/or obfuscating a portion of the representation of the display (e.g., obfuscating a portion of a physical display within the CGR environment).

Figure 2A:
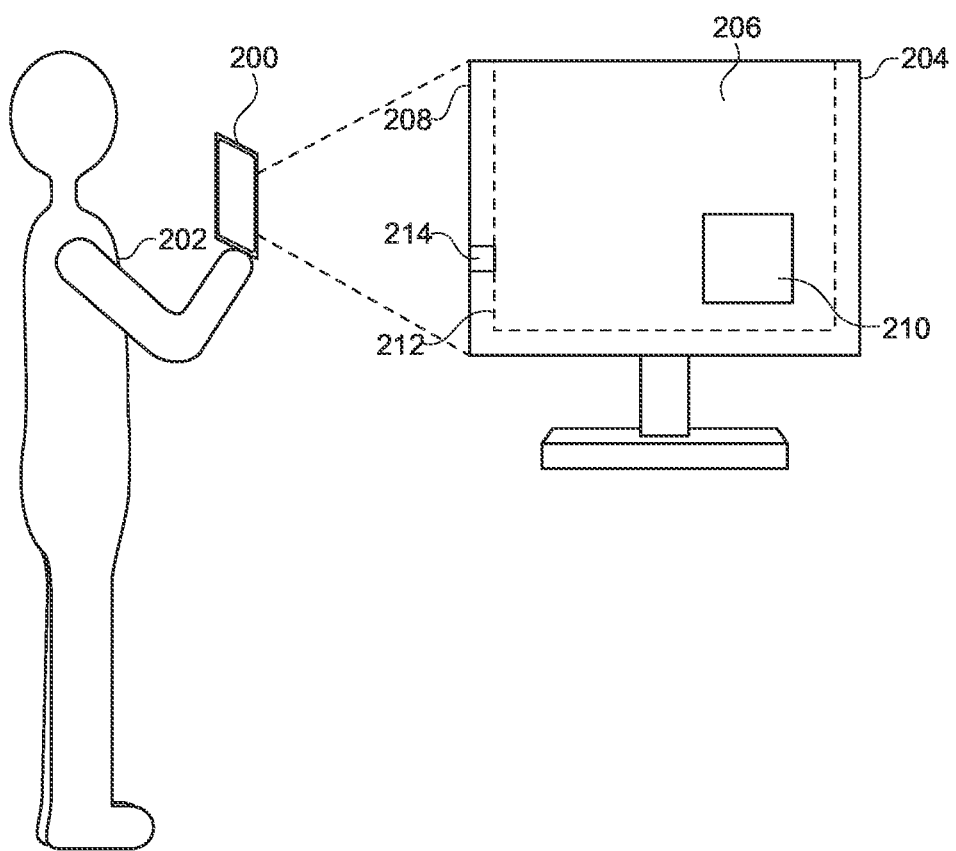
FIGS. 2A-2F depict exemplary techniques for dynamically controlling the size of a display in a CGR environment in accordance with aspects of the present disclosure.

FIGS. 2A-2F illustrate exemplary techniques for dynamically controlling the size of a display in a CGR environment in accordance with aspects of the present disclosure. In particular, FIG. 2A illustrates user 202 and electronic device 200. In some embodiments, electronic device 200 may be a wearable electronic device (e.g., an HMD). Examples of a wearable electronic device are described herein, such as with respect to electronic device 100a described above with reference to FIGS. 1A and 1B.

It is noted that although the discussion that follows is focused on a wearable electronic device, such as an HMD, this is done by way of example and should not be construed as limiting in any way. Indeed, the techniques disclosed herein may be applicable to any implementation and form factor of electronic devices configured to present a CGR environment (e.g., HMDs, HUDs, vehicle windshields having integrated display capability, windows having integrated display capability, etc.) as described above.

In embodiments, electronic device 200 may be configured to present a CGR environment to user 202. The CGR environment presented to user 202 may include presenting display 204. In aspects, display 204 may be a representation of a physical display (e.g., a monitor or screen of a physical computer). For example, display 204 may be a computer-generated simulation of a physical display. In some embodiments, the computer-generated simulation of a physical display may be configured to be perceived as a physical display by user 202, although display 204 may be a computer-generated simulation of a physical display, and/or may be configured to behave as a physical display. In some embodiments, the computer-generated simulation of a physical display may be a computer-generated display area with no corresponding physical counterpart and/or representation. In these cases, the computer-generated simulation of a physical display may be a display area that may not simulate a physical display. In these embodiments, the computer-generated simulation of a physical display may not be configured to be perceived as a physical display by user 202, but instead may be configured to be perceived as a virtual display area, and/or may not be configured to behave as a physical display.

In some embodiments, display 204 may represent a physical display that is presented to user 202 via electronic device 200. For example, display 204 may include an actual physical display, and may not be a computer-generated simulation of the display. In this case, display 204 may be presented to user 202 such that user 202 may view the physical display, instead of viewing a computer-generated simulation of the physical display. In some embodiments, presenting the physical display to user 202 may be performed via a transparent or translucent display of electronic device 200, or may be performed via pass-through video as described above, such that user 202 may perceive the actual physical display. In yet other embodiments, presenting the physical display to user 202 may be performed by superimposing a photorealistic image and/or video of the physical display on a simulated environment.

In other embodiments, display 204 may include a computer-generated simulation of a physical display (e.g., a computer-generated simulation of a physical display or a purely virtual display) as described above. The computer-generated simulation of the physical display may be presented to the user 202 via electronic device 200. In some embodiments, presenting the computer-generated simulation of the physical display to user 202 may include displaying the computer-generated simulation of the physical display on a display of electronic device 200. In some implementations, the computer-generated simulation of the physical display may be superimposed upon a physical environment, or a representation thereof (e.g., as in MR implementations), such that user 202 may perceive the computer-generated simulation of the physical display superimposed over the physical environment. In other implementations, the computer-generated simulation of the physical display may be a virtual object that is part of a fully CGR environment (e.g., as in VR applications).

It is noted that display 204, whether a representation of a physical display or a computer-generated simulation, may be presented as a 3D object. As such, user 202 may perceive display 204 as a 3D representation of a physical display. In some embodiments, where display 204 is a computer-generated simulation of a physical display, display 204 may be presented to the user with a blurred background, and/or a translucent background, such that objects behind display 204 may be visible, or at least somewhat visible, to user 202. In the case where display 204 is a physical display, display 204 may be presented to user 202 without a blurred or translucent background, such that objects behind display 204 may not be visible to user 202.

In embodiments, display 204 may be represented as having a particular size. For example, where display 204 is an actual physical display, the size of display 204 may be determined by the actual size of the display. In implementations where display 204 is a computer-generated simulation, the size of the simulated display may be predetermined and may be perceived by user 202. It is noted that in a computer-generated simulation, the size of display 204 may be a size as perceived by the user in the CGR environment. In these cases, user 202 may perceive display 204 to be a particular size as determined by operations and functionality of electronic device 200.

In some embodiments, display 204 may include display area 206. Display area 206 may be configured to function as the display area of display 204 such that visual objects (e.g., visual object 210) to be displayed by display 204 may be presented on display area 206. In embodiments, display area 206 may have a particular size, which may comprise a portion or the entirety of display 204. In some embodiments, display area 206 may comprise the entirety of display 204 such that display area 206 encompasses the area from edge to edge of display 204. In other embodiments, display 204 may include bezel 208 of a particular width that surrounds display 204. In this case, display area 206 may encompass the area of display 204 not including bezel 208.

Visual object 210 may be a visual object configured to be displayed on display 204. In some aspects, visual object 210 may be a 2D object and may be any visual object that may be configured to be displayed on a display. For example, visual object 210 may be an icon, a 2D window, an image, etc.

In some embodiments, such as in implementations where display 204 may be a physical display, visual object 210 may be an object displayed on the physical display. For example, visual object 210 may be displayed as a graphical object of display 204. In these cases, visual object 210 may be presented to user 202 via a transparent or translucent display of electronic device 200, or via pass-through video, such that user 202 may perceive the graphical object displayed on display 204.

In other embodiments, visual object 210 may be a visual object displayed on a display of electronic device 200. In some implementations, the visual object displayed on electronic device 200 may be superimposed on the representation of display 204. Where display 204 is a physical display, user 202 may perceive the visual object as being displayed on display 204, although visual object 204 may not be displayed on display 204 but rather on a display of electronic device 200. Where display 204 is a computer-generated simulation of a physical display, user 202 may perceive the visual object as being displayed on display 204, where both visual object 204 and display 204 may be displayed on a display of electronic device 200.

Display 204 may also be configured to include a proximity threshold 212. In embodiments, proximity threshold 212 may be visible or may be invisible on display 204. Proximity threshold 212 may be predetermined to be a particular distance 214 from an edge of display area 206, or from an edge of display 204. As a traditional display may have four edges, in some embodiments, a proximity threshold may be configured for each of the edges or for any subset of the four edges. For example, a proximity threshold may be configured for the right and left edges of display 204, but no proximity threshold may be configured for the top and bottom edges of display 204. As will be described in more detail below, proximity threshold 212 may be used to determine whether display 204 may be resized in accordance with aspects of the present disclosure. It is noted that in some implementation, display 204 does not include a proximity threshold for any of the edges.

Figure 2B:
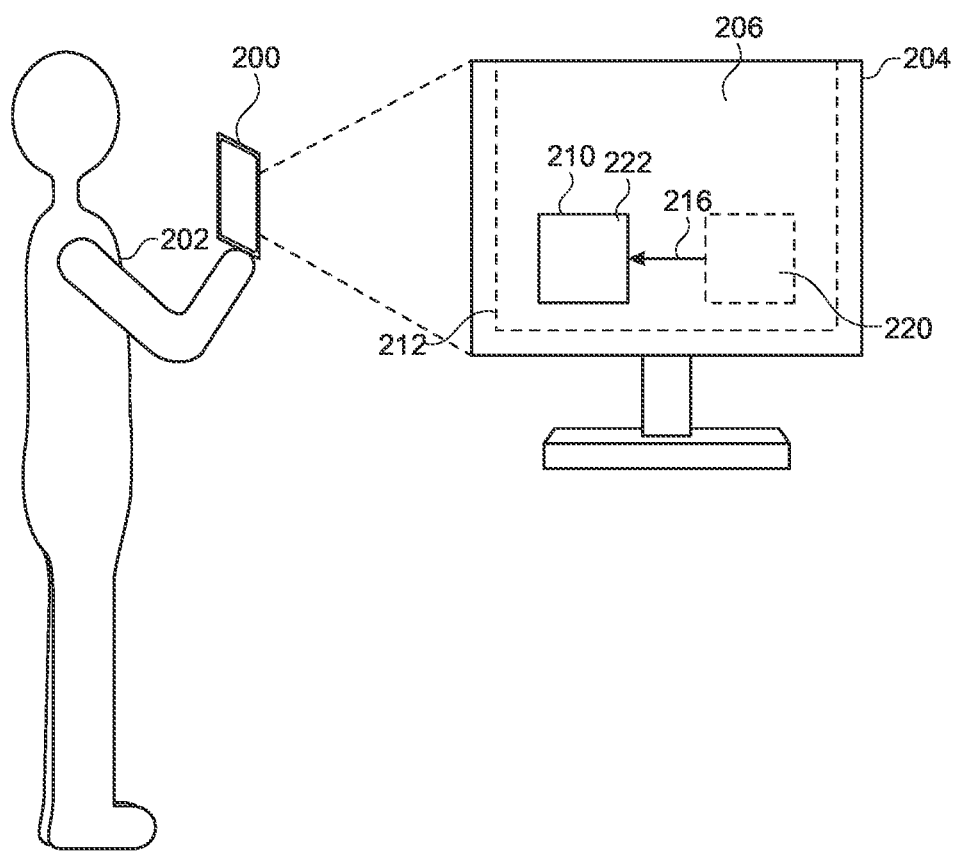

FIG. 2B illustrates an example of visual object 210 being moved in direction 216 from first location 220 to second location 222 of display area 206. In aspects, the moving of visual object 210 from first location 220 to second location 222 may be in response to a request to move visual object 210. The request to move visual object 210 may be included in a user input. For example, a user (e.g., user 202, or another user) may drag or otherwise move visual object 210 from first location 220 to second location 222. The dragging or moving of visual object 210 may be performed using input sensors, as described above, configured to detect a user input to interact with visual objects of the CGR environment. In some embodiments, the input sensors may include a mouse, a stylus, touch-sensitive surfaces, image-sensors, etc.

As illustrated in FIG. 2B, the moving operation of visual object 210 in direction 216 from first location 220 to second location 222 may not meet a criterion for resizing display 204. In embodiments, the criterion for resizing display 204 may include any one or more of the second location being within a proximity threshold of an edge of the display, the second location being at least partially outside of the display area of the display, and/or the moving operation being in a particular direction. When the moving operation of visual object 210 meets any of the above criteria, display 204 may be resized in accordance with aspects of the present disclosure. However, when the moving operation of visual object 210 does not meet any of the above criteria, resizing of display 204 may be forgone.

As used herein, a second location being within a proximity threshold of an edge of the display may include the situation where the visual object being moved to the second location at least partially enters the proximity threshold when in the second location. Similarly, the second location being at least partially outside of the display area of the display may include the situation where the visual object being moved to the second location at least partially enters the area outside the display area of the display when in the second location.

For example, as illustrated in FIG. 2B, second location 222 may be within display area 206. However, in this case, second location 222 may not be within a predetermined proximity (e.g., proximity threshold 212) to the edge of display 204, or at least partially outside display area 206. As such, in the example illustrated in FIG. 2B, display 204 may not be resized. In some embodiments, the criterion for resizing the display is not met until the entire visual object being moved enters the proximity threshold or the area outside the display area.

Figure 2C:
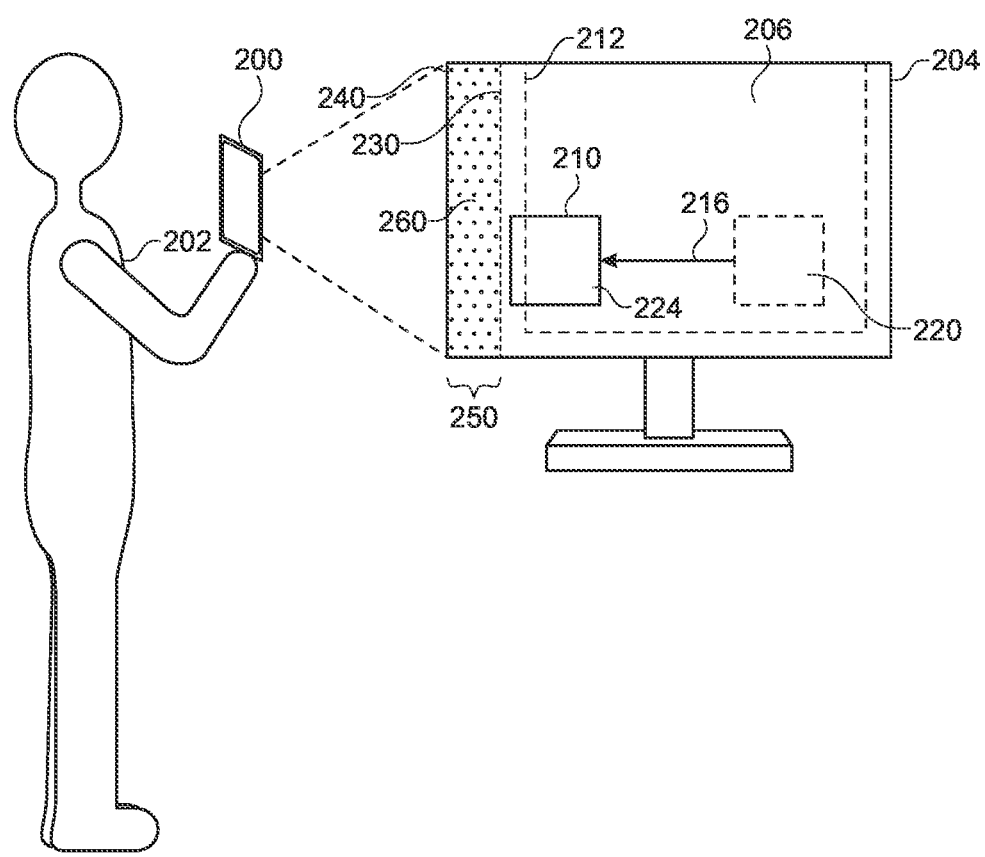

FIG. 2C illustrates another example of a moving operation of visual object 210 in direction 216 from first location 220 to second location 224. As shown in FIG. 2C, a request to move visual object 210 from first location 220 to second location 224 may be received. Second location 224 is a location in which at least a portion of visual object 210 is within proximity threshold 212 to edge 230 of display 204. In this case, second location 224 being a location in which at least a portion of visual object 210 is within proximity threshold 212 to edge 230 of display 204 meets a criterion for resizing display 204. In response to the second location meeting a criterion for resizing the display, display 204 may be resized.

Figure 2D:
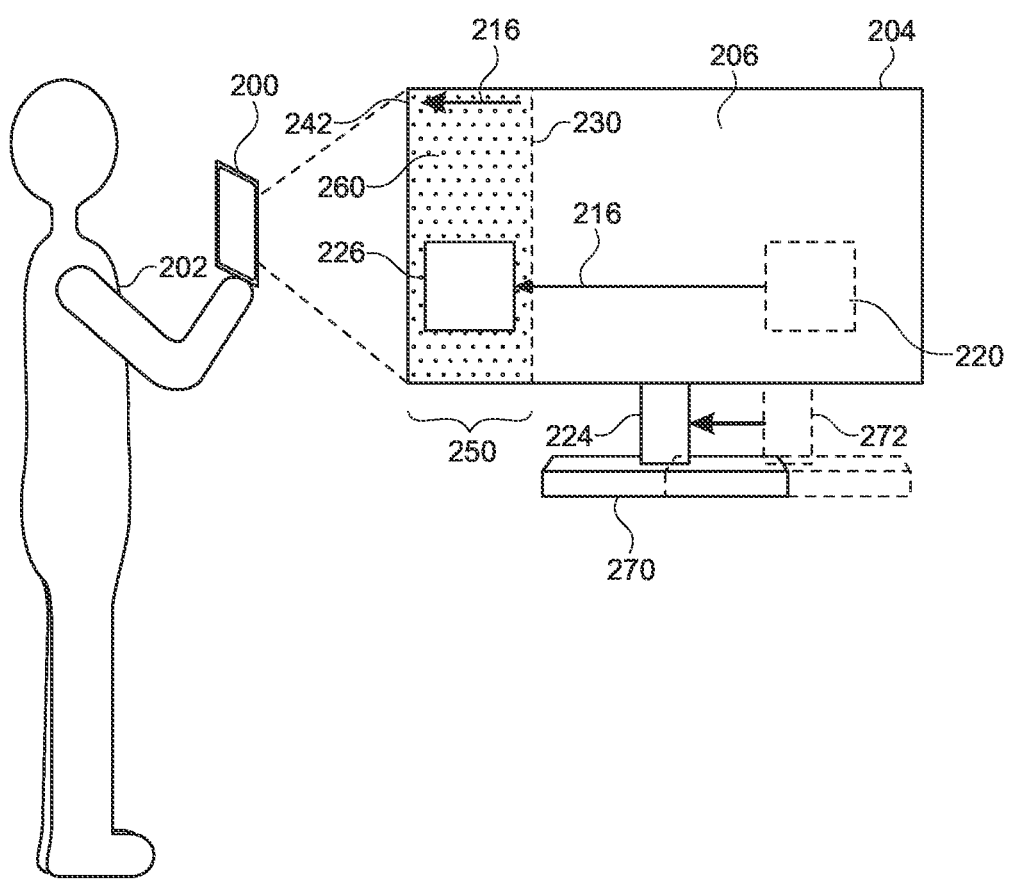

FIG. 2D illustrates yet another example of a moving operation of visual object 210 in direction 216 from first location 220 to second location 226. As shown in FIG. 2D, a request to move visual object 210 from first location 220 to second location 226 may be received. Second location 226 is a location in which at least a portion of visual object 210 is outside the display area of display 204. In this case, second location 226 being a location in which at least a portion of visual object 210 is outside the display area of display 204 meets a criterion for resizing display 204. In response to the second location meeting a criterion for resizing the display, display 204 may be resized.

In embodiments, resizing display 204 may include expanding the display area of display 204 by displaying display area 206 and additional display area 260. Additional display area 260 may be a computer-generated display area that may be appended or otherwise added to display 204 such that expanded display 204 may be perceived as larger by user 202. In some embodiments, additional display area 260 may be added to display 204 such that the expanded display 204 may be perceived as a single, cohesive, and integrated display by user 202. In other words, in these embodiments, user 202 may not perceive that additional display area 260 has been appended to display 204. In implementations where display 204 is a computer-generated simulation, expanding the display 204 may include displaying display 204 in a larger size, including additional display area 260.

In embodiments, expanding display 204 may include expanding the display in the direction 216 of the moving operation, from the edge 230 of the current display 204 (e.g., the edge of the physical display or the edge of the computer-simulated representation of a physical display) to the edge (e.g., edge 240 in FIG. 2C or edge 242 in FIG. 2D) of the expanded display 204 by an amount 250. In these embodiments, edge 230 may be determined to be the expanding edge because the request to move the visual object 210 includes a request to move visual object 210 toward edge 230.

The size of the expansion (e.g., the size of additional display area 260, and/or the size of amount 250) may be determined by the size of visual object 210 and may be sized to accommodate displaying visual object 210 in the expanded area. In other embodiments, the size of the expansion may be determined by the amount that the second location (e.g., second location 240 in FIG. 2C or edge 242 in FIG. 2D) and/or the amount that visual object 210 has moved passed proximity threshold 212 toward the edge. For example, where second location 224 and/or visual object 210 have moved x distance passed edge 230, display 204 may be expanded by an amount x. In yet other embodiments, the size of the expansion may be determined based on ergonomics designs, such as to reduce neck strain.

In some embodiments, for example where display 204 is a physical display and visual object 210 is a visual object displayed on display 204, as visual object 210 enters into the expanded display area of display 204, visual object 204 may be transitioned to a visual object being displayed on a display of electronic device 200. In this sense, user 202 is able to perceive visual object 210 even after visual object 210 may be moved to outside the physical display. The transition may also allow for a seamless presentation of visual object 210 as it is moved into the expanded area.

It is noted that although the present discussion is focused on an expansion of the display from the left edge of the display leftward, the techniques herein are equally applicable where the expansion may be from the right edge rightward in response to moving a visual object toward the right edge of the display. Additionally, the same applies to an expansion of the top and/or bottom edges. Also, in some embodiments, it is noted that the expansion of the display may be limited to left and right, and moving an object to within a proximity of the top or bottom edges, and/or outside of the area proximate to the top or bottom edges, may not cause an expansion of the display.

In embodiments, the expansion of display 204 may be performed as soon as visual object 210 crosses proximity threshold 212 (e.g., as shown in FIG. 2C) or edge 230 (e.g., as shown in FIG. 2D), and display 204 may continue to expand as more of visual object 210 crosses proximity threshold 212 or edge 230. In other embodiments, display 204 may not be expanded until at least a predetermined portion of visual object 210 has crossed proximity threshold 212 (e.g., as shown in FIG. 2C) or edge 230 (e.g., as shown in FIG. 2D), or until the entirety of visual object 212 has crossed proximity threshold 212 or edge 230.

In some embodiments, expanding display 204 may include animating the expansion operation. For example, with reference to FIG. 2D, as display 204 is expanded from current edge 230 to expanded edge 242, the expansion may be animated by, e.g., displaying the edge of display 204 as moving or shifting from current edge 230 to expanded edge 242. The speed of the animation may be based on the speed at which visual object 210 is being moved, or may be based on a predetermined and/or fixed value. In some embodiments, as will be described in more detail below, as display 204 is expanded, the expanded display may be curved.

In embodiments, resizing operations of display 204 (e.g., expanding and/or contracting) may include rearranging structural elements of display 204. For example, the representation of display 204 may include display stand 270. Display stand 270 may be a visual element that provides more realism to the representation of display 204. In embodiments, resizing display 204 may also include shifting display stand 270 to an appropriate location relative to the expanded display such that the proportions of the display may be maintained. For example, display stand 270 may be shifted from location 272 in the unexpanded display 204 to location 274 in the expanded display 204. As such, after the expansion operations of display 204, the stand retains a location approximately in the middle portion of display 204, thereby maintaining the proportions of a display. In embodiments, the shifting of display stand 270 may be animated and may show the stand sliding from location 272 to location 274 as display 204 is expanded.

In some embodiments, the expansion of display 204 may be limited to a particular size. For example, a threshold size may be used whereupon it being reached by the size of expanded display 204, expansion of display 204 may be forgone. For example, based on moving operations of visual object 210 meeting a resizing criterion (e.g., a criterion for expanding the display), display 204 may be determined to be expanded to a particular size as described above. For example, in order to accommodate visual object 210 in the expanded display, display 204 may be determined to be expanded by amount 250 by adding additional display area 260, resulting in a target expanded size for the expanded display area of display 204. Where there is no threshold size, display 204 may be expanded as determined. However, where a threshold size is present, the threshold size may be compared to the target expanded size, and where the target expanded size of display 204 exceeds the threshold size, expansion of display 204 may be forgone. In some embodiments, display 204 may still be expanded, but the expansion may be limited to the threshold size.

Figure 2E:
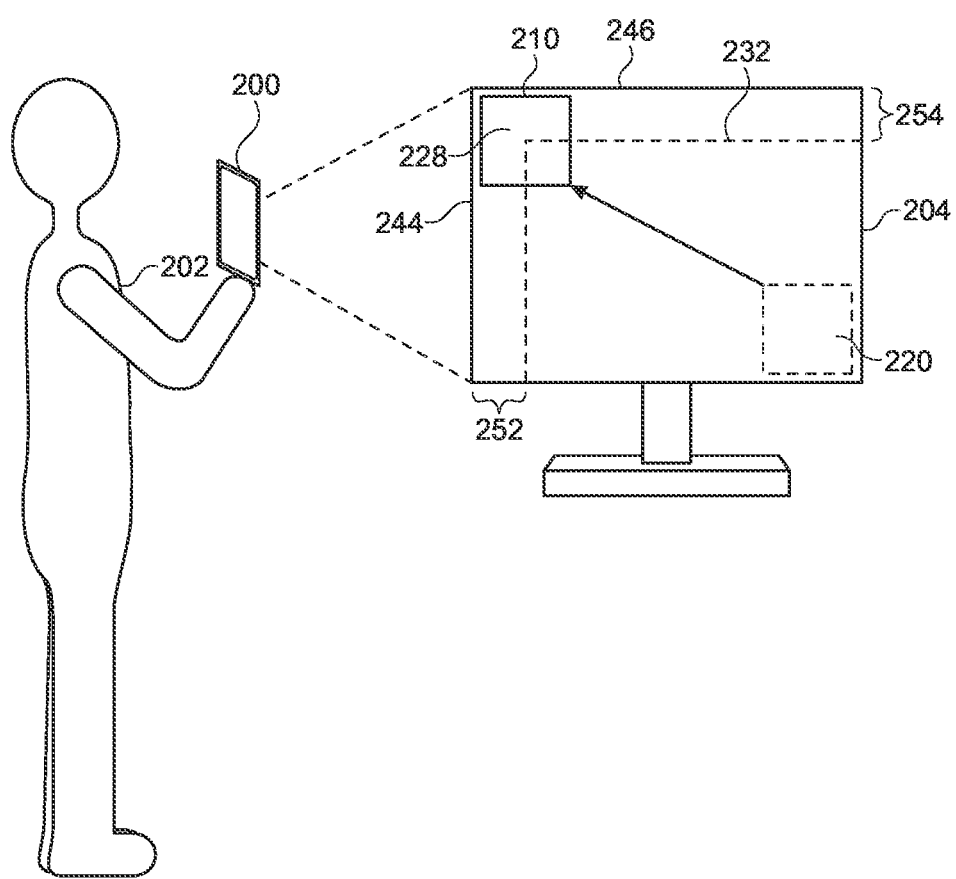

FIG. 2E illustrates another example of a dynamic resizing operation of a display. In the example illustrated in FIG. 2E, a request to move visual object 210 from first location 220 to second location 228 may be received. In this example, second location 228 may be a location in which at least a portion of visual object 210 may meet a resizing criterion with respect to more than one edge at the same time. For example, second location 228 may be a location in which at least a portion of visual object 210 is outside the display area proximate to both the left edge and the top edge of display 204. In this case, display 204 may be expanded from both the left edge 230 and top edge 232 in accordance with the description above. The expansion of the left edge 230 may be to edge 244 and may comprise animating the expansion. Similarly, the expansion of the top edge 232 may be to edge 246 and may comprise animating the expansion. In aspects, the expansion of both left edge 230 and top edge 232 may be done simultaneously or near-simultaneously, and user 202 may perceive the expansion of the two edges as a diagonal expansion.

In some embodiments, not illustrated, user 202 may first move visual object 210 from first location 220 to a second location meeting a resizing criterion with respect to a single display edge (e.g., a second location outside the display area proximate to the left edge of display 204) and then move visual object 210 from the second location to a third location meeting a resizing criterion with respect to another display edge (e.g., a third location outside the display area proximate to the top edge of display 204). In this case, display 204 may first be expanded from the left edge in response to the moving of visual object 210 to the second location, and then subsequently expand from the top edge in response to the moving of visual object 210 to the third location. Alternatively, display 204 may not first be expanded from the left edge and then subsequently from the top edge when a visual object is moved to the second and third locations, respectively, but instead may be expanded from the left edge and the top edge simultaneously, or near-simultaneously, when the visual object is moved to the third location. In that sense, the second location may be thought of as a transitional location and may not cause resizing operations. In aspects, a transitional location may be determined based on whether the moving operations have stopped for a predetermined amount of time. For example, user 202 may first move visual object 210 to the second location, stop for a time period, and then move the visual object to the third location. In this case, if the time period does not exceed a predetermined threshold, the second location may be determined to be a transitional location and expansion of display 204 based on the second location may be forgone (e.g., expansion from the left edge) even if the second location otherwise meets a resizing criterion (e.g., it's a location within a proximity threshold or is a location outside the display area of display 204).

Figure 2F:
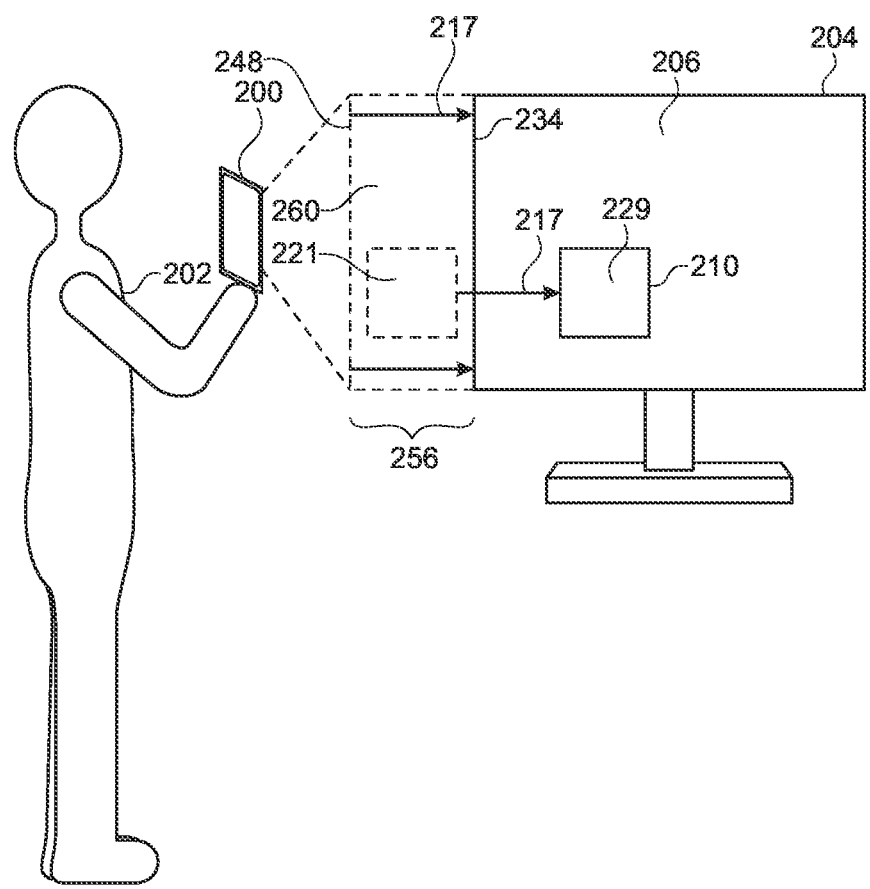

FIG. 2F illustrates an example of a dynamically controlling a resizing operation of a display that includes contracting the display. In the example illustrated in FIG. 2F, a request to move visual object 210 in direction 217 from first location 221 to second location 210 may be received. In embodiments, first location 221 may be part of an expanded display area of display 204. For example, display 204 may have previously been expanded to include additional display area 260 by expanding from edge 234 to edge 248 by an amount 256. In this case, moving visual object 210 to within display area 206, which may not include additional display area 260, may be determined to meet a resizing criterion. In this case, the resizing criterion may include contracting the expanded display back to the original display size by contracting from edge 248 in direction 217 to edge 234. Edge 234 may be the actual edge of display 204 (e.g., the edge of display 204 prior to the previous expansion). As described above, with respect to expansion operations, contracting operations may include animating the contraction of the edges such that the edge of display 204 appears to move from edge 248 to edge 234.

In some embodiments, moving visual object 210 to a second location beyond the bottom edge of display 204 may cause contracting operations that may minimize display 204 entirely. In this case, minimizing display 204 may include collapsing the entire display into a representation indicating that the display is in a minimized state. User 202 may interact with the minimized representation to cause display 204 to be restored to a previous size.

In some embodiments, not illustrated, the second location may not be entirely within display area 206 and may include at least a portion of additional display area 260. In this case, it may be determined that resizing criterion has been met, and display 204 may be contracted. In this case, display 204 may be contracted but only to a display size that is still able to accommodate displaying visual object 210 within the contracted display area. This partial contraction may be repeated as visual object 210 is moved to a location entirely within display area 206.

In other embodiments, first location 221 may not represent a part of an expanded display area of display 204, but instead may be part of unexpanded display area 206. In this example, the original size of display 204 may include additional display area 260 all the way to edge 248. For this example, the original size of display 204 may include display area 206 and additional display area 260. In this case, it may be determined that moving visual object 210 to second location 229 may support a smaller display area for display 204 while still accommodating display of visual object 210. This may be determined to meet a resizing criterion. In this case, the resizing criterion may include contracting the display area of display 204 to a smaller size. The display area of display 204 may be contracted from edge 248 in direction 217 to edge 234. Edge 248 may be the actual edge of display 204 (e.g., the edge of display 204 prior to the contraction). As described above, with respect to expansion operations, contracting operations may include animating the contraction of the edges such that the edge of display 204 appears to move from edge 248 to edge 234.

In implementations where display 204 is a physical display, contracting a previously unexpanded display may include obfuscating part of the display. For example, additional display area 260 may be obfuscated when contracting display 204 after moving visual object 210 to second location 229 such that the obfuscated parts of display 204 may not function to display visual objects. One application of this functionality may be in AV applications, where the obfuscated portion of the display may be obfuscated by replacing it with appropriate portions of the computer-generated simulation, such that user 202 may perceive display 204 as smaller while being able to perceive virtual objects behind the obfuscated portions of the display area.

Figure 3:
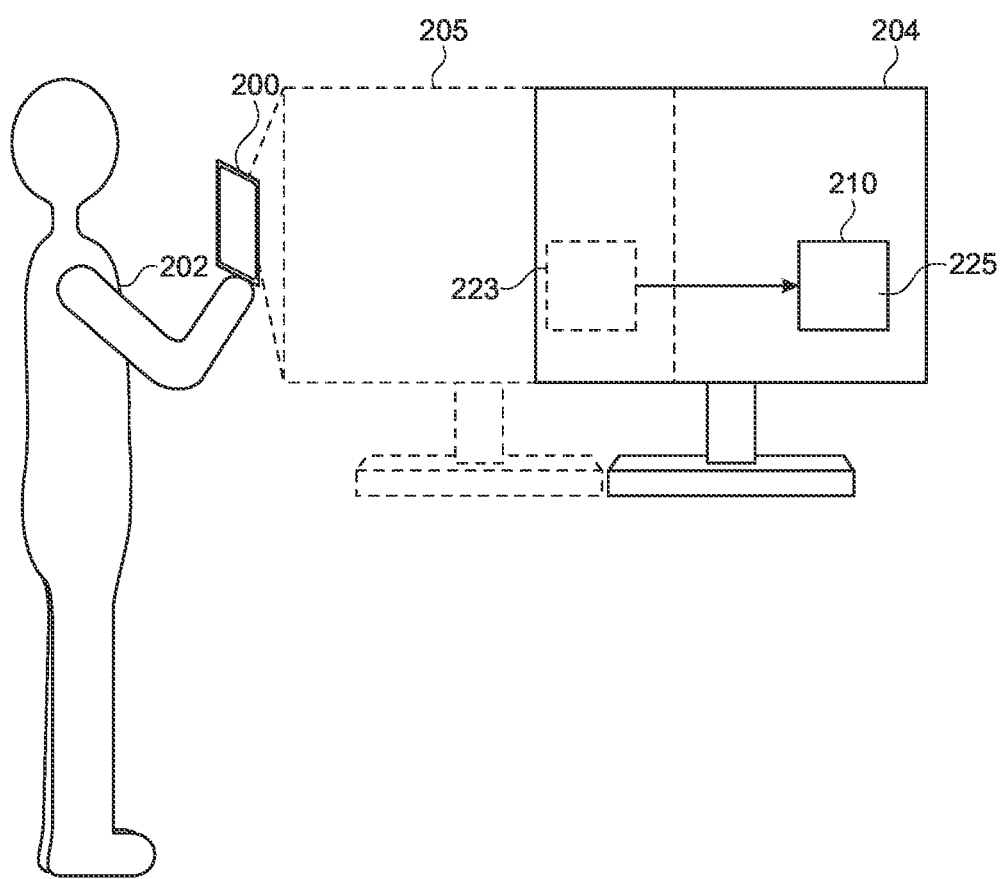
FIG. 3 depicts an example of a shifting operation of a display in a CGR environment in accordance with aspects of the present disclosure.

FIG. 3 illustrates an example of a shifting operation of a display. In this example, moving visual object 210 from first location 223 to second location 225 may meet a resizing criterion as described above with respect to FIGS. 2A-2F. However, in this example, instead of resizing display 204, display 204 is instead shifted in the direction of the moving operation. The amount of shifting may be based on the amount of moving after the visual object has been placed on location meeting a resizing criterion per the above discussion. This functionality may be employed by user 202 to move display 204 to another location when manipulating 2D visual objects displayed on display 204.

Figure 4A:
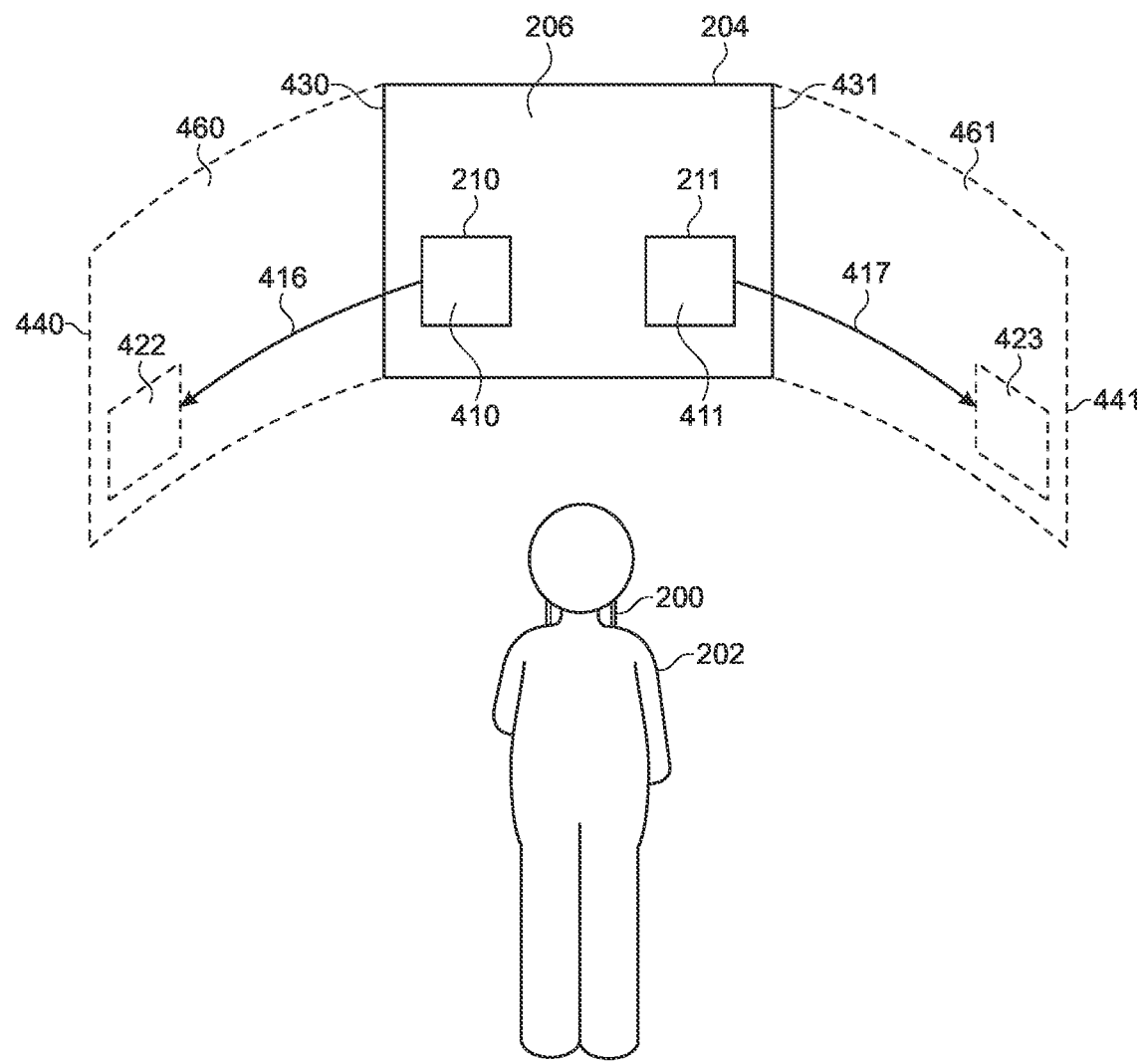
FIGS. 4A and 4B illustrate an example of resizing operations in accordance with aspects of the present disclosure.
Figure 4B:
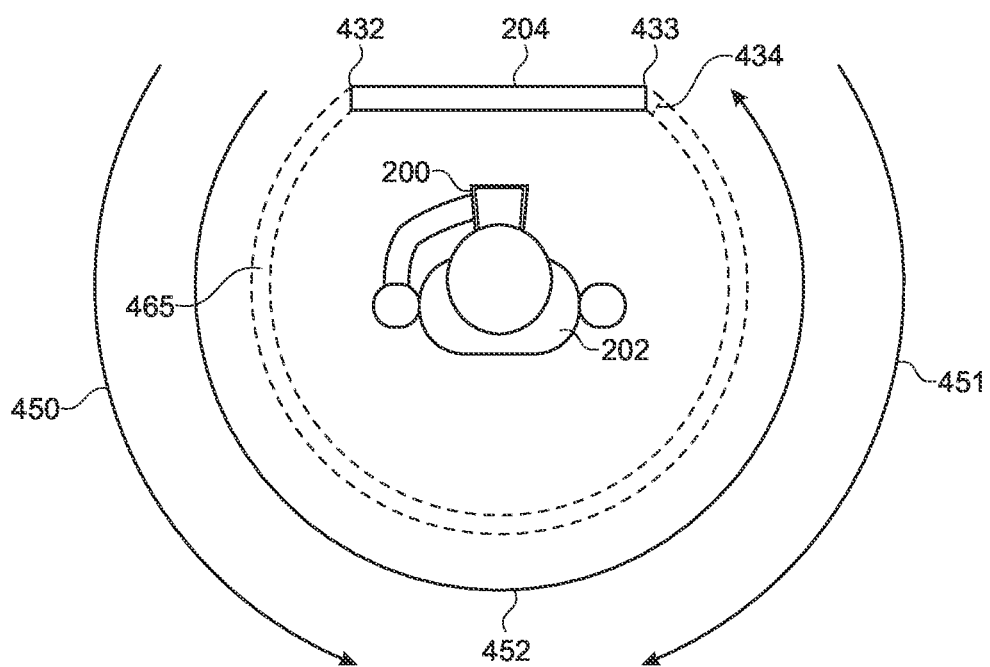

FIGS. 4A and 4B illustrate an example of resizing operations in accordance with aspects of the present disclosure. FIG. 4A illustrates user 202 and electronic device 200. As mentioned above, in some embodiments, electronic device 200 may be a wearable electronic device (e.g., an HMD). As also mentioned above, in some embodiments, electronic device 200 may be similar to electronic device 100a described above with reference to FIGS. 1A and 1B.

FIG. 4A illustrates user 202 being presented with a CGR environment that includes display 204. As described above, display 204 may be a physical display or a computer-generated simulation of a physical display. Display 204 may include visual objects 410 and 411 within display area 206. Visual objects 410 and 411 and display area 206 may be as described above. In some aspects, display 204 may be presented to user 202 as a curved display or may be presented as a flat display.

As described above, moving operations of visual objects 410 and/or 411 may cause dynamic resizing of display 204. In embodiments, dynamic resizing of display 204 may include expanding of display 204. For example, a request to move visual object 210 in direction 416 from location 410 to location 422 may be received. Moving visual object 210 in direction 416 from location 410 to location 422 may be determined to meet a resizing (e.g., expanding) criterion, as described herein. In response to moving visual object 210 in direction 416 from location 410 to location 422, display 204 may be expanded from edge 430 to edge 440 to include additional display area 460. Additional display area 460 may be a computer-generated virtual display area configured similarly to additional display area 260 described above. Similarly, a request to move visual object 211 in direction 417 from location 411 to location 423 may be received. Moving visual object 211 in direction 417 from location 411 to location 423 may be determined to meet a resizing (e.g., expanding) criterion, as described herein. In response to moving visual object 211 in direction 417 from location 411 to location 423, display 204 may be expanded from edge 431 to edge 441 to include additional display area 461. Additional display area 461 may be a computer-generated virtual display area configured similarly to additional display area 260 described above.

In embodiments, as display 204 is expanded from edge 430 to edge 440, and/or from edge 431 to edge 441, the expanded display areas may be curved, as can be seen in FIG. 4A. In some embodiments, before the expansion, display 204 may or may not be curved, but the expanding operations may cause display 204 to be curved regardless. In these cases, after expansion, not only may the additional area 460 be curved, but the original pre-expansion display may also be curved. In this sense, the expanded display is configured to be perceived by user 202 as a single, cohesive, and integrated curved display. In some embodiments, the expanded display may be contracted based on moving operations of visual object 410, as described above. In this case, whether the original pre-expansion display 204 was curved or not, after contraction, display 204 may remain curved. In other embodiments, after contraction operations, display 204 may return to a flat configuration.

FIG. 4B illustrates an example top-view configuration of resizing operations in accordance with aspects of the present disclosure. In particular, FIG. 4B illustrates the curving aspects of expansion operations. For example, as display 204 is expanded in direction 450, the expanded display is curved. Similarly, as display 204 is expanded in direction 451, the expanded display is also curved. In some embodiments, the curving of the expanded display may cause the expanded display to partially or fully surround user 202, such that the user may perceive the display as a display surrounding him or her. In some embodiments, expansion operations in a single direction 452 may continue from one edge of display 204 to the other edge. For example, user 202 may drag a visual object from one location within the display area of display 204 toward edge 432 of display 204 in direction 452. User 202 may continue to drag the visual object to a location outside of display 204 proximate to edge 432, causing display 204 to expand from edge 430 in direction 452. User 202 may continue to drag the visual object in direction 452 through the expansion of display 204, causing display 204 to continue to be expanded and curved. If user 202 continues to drag the visual object through the expansion until the leading edge 434 of the expansion meets edge 433 of display 204, the result would be a 360 degree curved expanded display wholly surrounding user 202, as illustrated in FIG. 4B. It is again noted that, as described above, display 204 may be a curved display, even though display 204 is illustrated as a flat display in FIG. 4B.

In some embodiments, the expanded display area surrounding user 202 may be rotated when user 202 moves his or her head toward the left or the right in order to provide an ergonomically beneficial approach that may reduce neck strain. For example, as user 202 moves his or her head to the right, the expanded display area surrounding user 202 may be rotated toward the left, in order to "bring" the portions of the expanded display area into view of user 202. In this manner, user 202 does not have to turn his or her neck excessively to view the portions of the expanded display area that are not within the front periphery of user 202.

Figure 5:
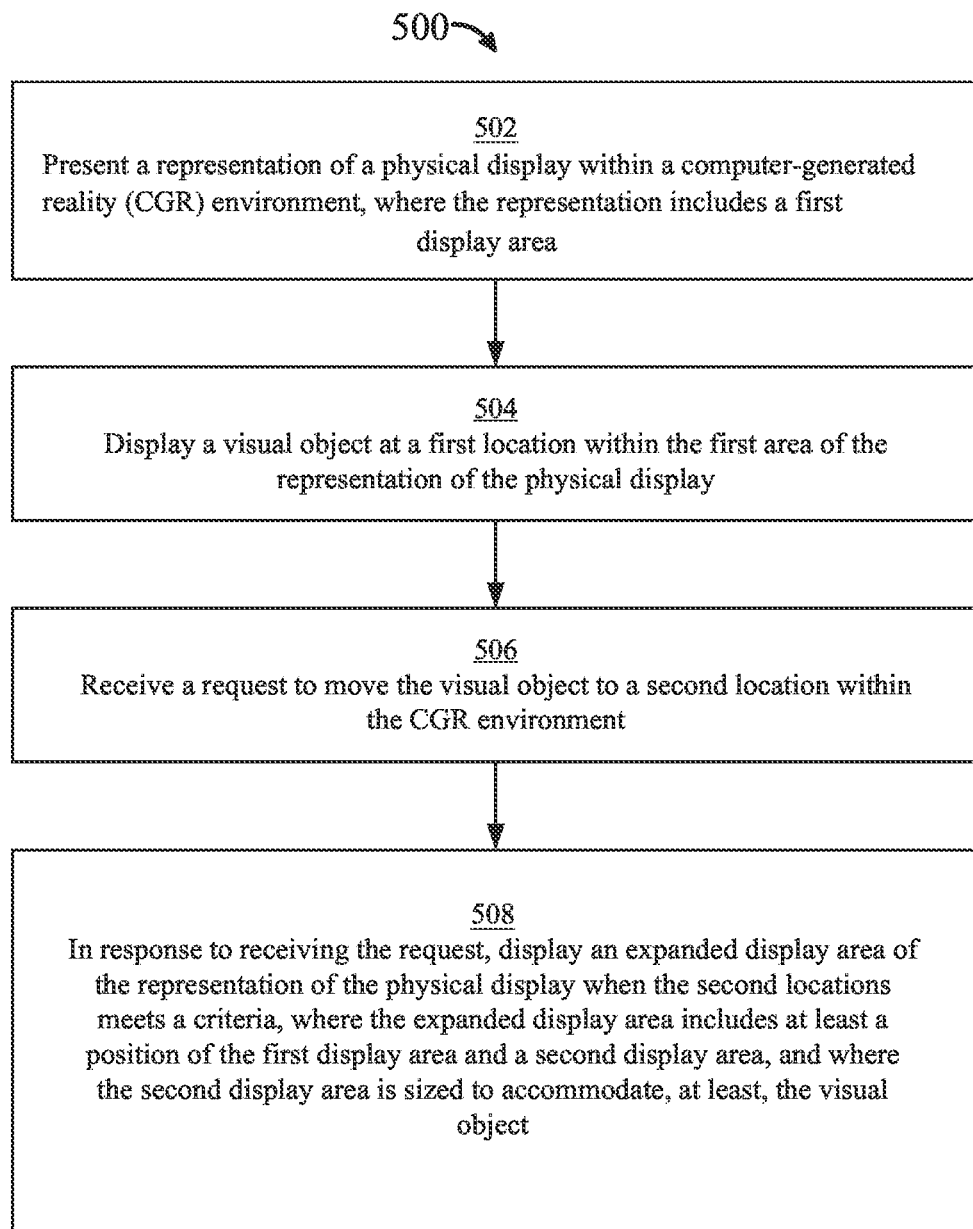
FIG. 5 is a flow diagram illustrating a method executed to implement aspects of the present disclosure.

FIG. 5 is a flow diagram illustrating method 500 for dynamically controlling the size of a display in a CGR environment. In some embodiments, method 500 may be performed by an electronic device such as electronic device 100a described above with reference to FIGS. 1A and 1B, and/or electronic device 200.

At block 502, a representation of a physical display within a CGR environment is presented to a user. For example, an electronic device, such as electronic device 200, may be used to present a representation of a physical display (e.g., display 204) to a user (e.g., user 202). In some embodiments, the representation of the display may be an actual physical display presented to the user via a translucent display of the electronic device or pass-through video. In other embodiments, the representation of the display may be a computer-generated simulation of a physical display displayed on a display of the electronic device. In embodiments, the representation of the physical display may include a first display area (e.g., display area 206).

At block 504, a visual object (e.g., visual object 210) may be displayed at a first location within the first display area of the representation of the physical display. In some embodiments, the visual object may be displayed via the display of the wearable electronic device. In some embodiments, for example, where the representation of the physical display is an actual physical display, the visual object may be displayed on the physical display. In aspects, the visual object may be a 2D object and may be any visual object that may be configured to be displayed on a display. For example, the visual object may be an application icon, a 2D application window, an image, a thumbnail, etc.

At block 506, a request to move the visual object to a second location within the CGR environment may be received. For example, user input may include a request to drag the visual object from the first location to a second location. The user input may include a dragging operation performed using any input sensor configured to operate within a CGR environment, such as a mouse, a stylus, a touch-sensitive surface, image-sensors, etc.

At block 508, in response to receiving the request to move the visual object to the second location, an expanded display area of the representation of the physical display is displayed when the second location meets a criterion. The expanded display area may include at least a portion of the first display area and a second display area. In embodiments, the second display area (e.g., additional display area 260) may be a computer-generated display area that may be added to the representation of the physical display to generate the expanded display area. In some embodiments, the second display area may be added to the representation of the physical display such that the expanded display area may be perceived as a single, cohesive, and integrated display by a user.

In some embodiments, the criterion that is met by the second location in order to expand the display area may include any one or more of the second location being within a proximity threshold of an edge of the representation of the physical display, the second location being at least partially outside of the first display area, and/or the request to move the visual object being in a particular direction.

In embodiments, displaying an expanded display area of the representation of the physical display may include expanding the representation of the physical display in the direction in which the visual object may have been moved. The expanding may include expanding from an edge of the representation of the physical display in the direction of the visual object move. In aspects, the expansion operation may be animated. In some embodiments, when the visual object has been moved to a location meeting a resizing criterion with respect to a top or bottom edge of the representation of the physical display (e.g., the second location is a location within a proximity threshold of a top or bottom edge, or when the second location is a location at least partially outside of the first display area proximate to the top or bottom edge) the displaying of the expanded display area of the representation of the physical display may be forgone. Instead, the size of the representation of the physical display is maintained.

In some embodiments, the size of the second display area (e.g., the size of the expansion) may be determined by a size sufficient to accommodate the visual object in the second location. In some cases, the size of the second display area (e.g., the width of the second display area) may be less than the size (e.g., the width) of the visual object, such as in cases in which at least a portion of the visual object remains within the first display area. In other cases, the size of the second display area may be at least the size of the visual object, such as in cases in which the entirety of the visual object is outside the first display area when in the second location.

In embodiments, expanding the representation of the physical display may include limiting the expansion of the representation of the physical display to a predetermined threshold size. For example, an expanded area of a target size may be determined to accommodate the visual object at the second location. In this case, the target size may exceed a predetermined threshold size. In response to the target size exceeding the predetermined threshold size, the expanded area may be limited to the threshold size, or the expansion of the display area may be forgone altogether.

In some embodiments, the visual object may be moved from the second location to a third location within the first display area. In these embodiments, it may be determined that the expanded display area is no longer necessary to accommodate the visual object. In these cases, the expanded display area may be contracted back to its original pre-expansion size. For example, the second area may no longer be displayed, and instead, only the first display area may be displayed. In embodiments, the contraction of the expanded area may be animated.

In embodiments, when the representation of the physical display is expanded, such as by displaying the expanded display area, the representation of the physical display may be curved. For example, the first display area and the second display area may be curved when the expanded display area is displayed. In some embodiments, only the second display area may be curved, while the first display area remains in flat form. In some embodiments, after the expanded display area is contracted, the contracted display area may maintain a curve form. In other embodiments, after the expanded display area is contracted, the contracted display area may be displayed in a flat form.

In some embodiments, after expansion, at least a portion of the visual object may be displayed on the first display area, and at least another portion of the visual object may be displayed on the second display area. In this manner, the user may perceive the visual display object as being displayed in a single, coherent display, without indication that the display is an expanded display composed of the original first display area and the additional second display area.

Aspects of the present disclosure are directed to systems and techniques that provide functionality for controlling the displaying of representations of a system bar in a display within a CGR environment. In embodiments, controlling the displaying of representations of a system bar in a display may include displaying a first representation of the system bar in a first region of the display (e.g., a physical or virtual display) of the CGR environment, detecting, while the system bar is not selected, an event in a second region of the display, and displaying a second representation of the system bar in the second region when the event meets a system bar movement criteria. In embodiments, the system bar movement criteria may include events that may indicate potential and/or actual user interaction with elements in the second region of the display. For example, the system bar movement criteria may include an opening of an application in the second region of the display, detecting a user's gaze directed to the second region of the display, detecting a movement of a cursor to the second region of the display, a selection of an interactive element for displaying the second representation of the system bar in the second region of the display, etc.

Figure 6A:
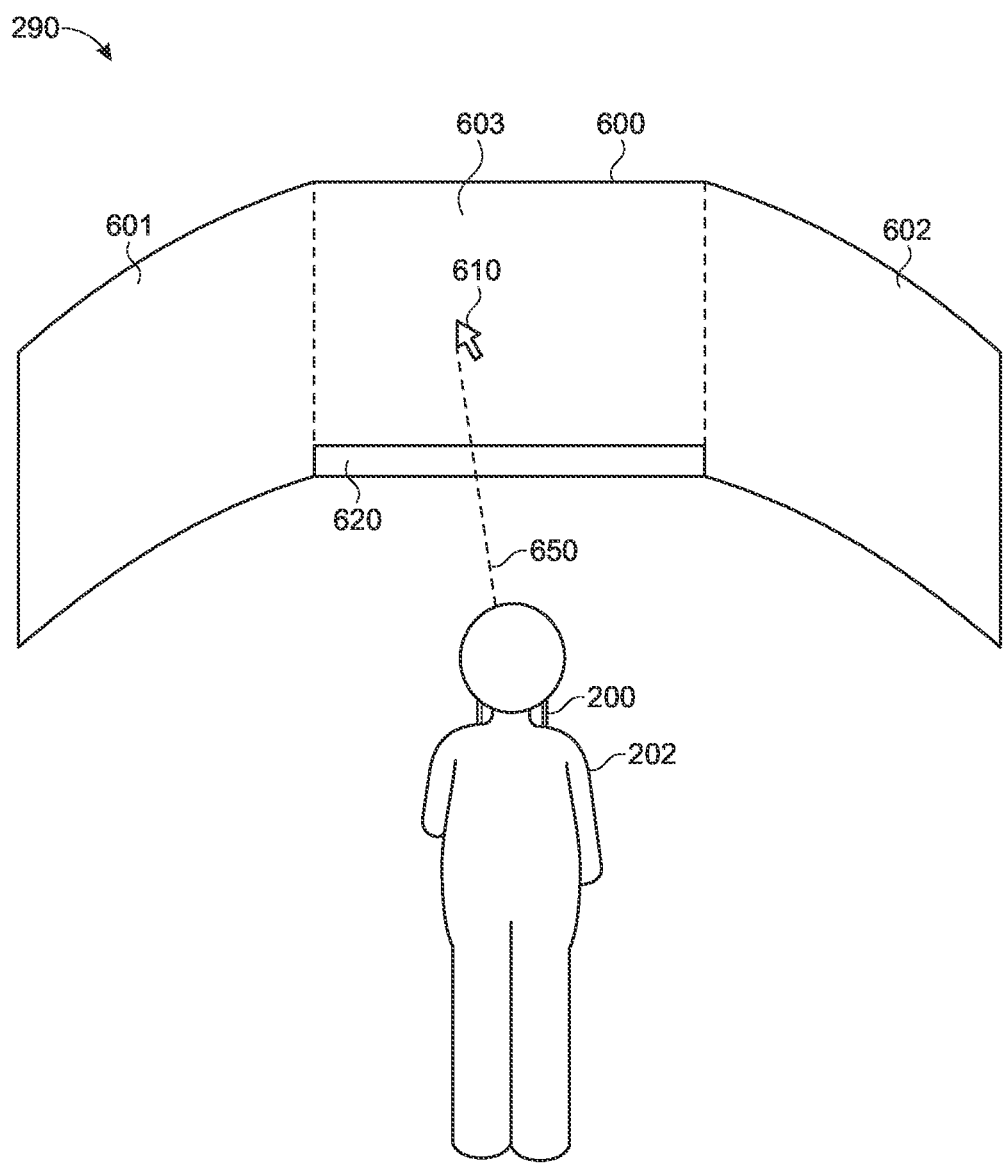
FIGS. 6A and 6B depict exemplary techniques for controlling the displaying of representations of a system bar in a display within a CGR environment in accordance with aspects of the present disclosure.
Figure 6B:
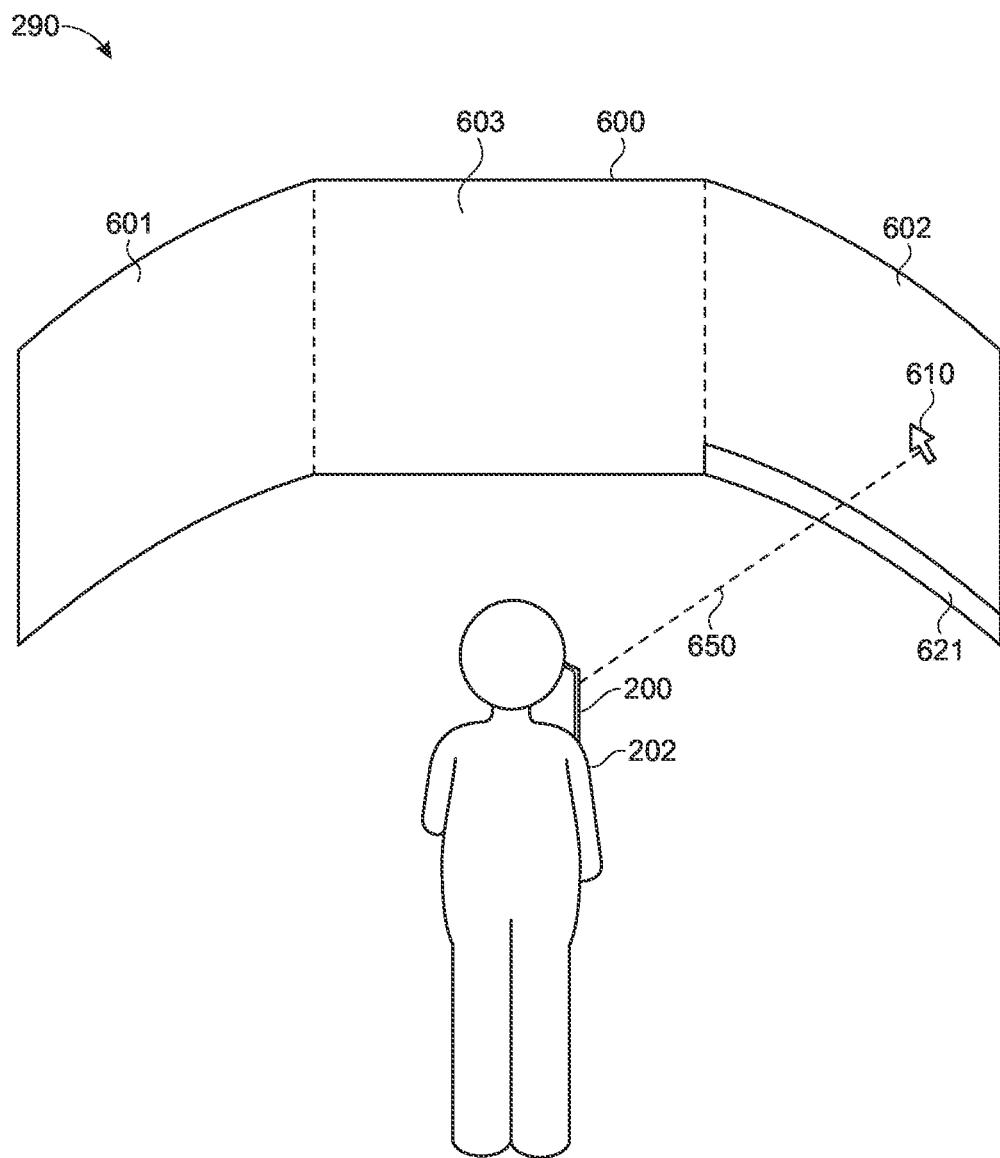

FIGS. 6A and 6B illustrate exemplary techniques for controlling the displaying of representations of a system bar in a display within a CGR environment in accordance with aspects of the present disclosure. In particular, FIGS. 6A and 6B illustrate an example in which the displaying of representations of a system bar is controlled based on an event that meets a system bar movement criteria that includes a change in a user's gaze or a change in a cursor position.

FIG. 6A illustrates user 202 wearing electronic device 200, which is configured to allow user 202 to view CGR environment 290. As mentioned above, in some embodiments, electronic device 200 may be similar to electronic device 100a described above with reference to FIGS. 1A and 1B.

As illustrated in FIG. 6A, CGR environment 290 includes display 600. In embodiments, display 600 may be a representation of a display (e.g., a physical display such as a monitor or screen of a physical computer), such as a computer-generated simulation of a physical display. In some embodiments, the computer-generated simulation of a display may be a computer-generated display area with no corresponding physical counterpart and/or representation. In these cases, the computer-generated simulation of a physical display may be a display area that may not simulate a physical display. In some implementations, the computer-generated simulation of the physical display may be superimposed upon a physical environment, or a representation thereof (e.g., as in MR implementations), such that user 202 may perceive the computer-generated simulation of the physical display superimposed over the physical environment. In other implementations, the computer-generated simulation of the physical display may be a virtual object that is part of a fully CGR environment (e.g., as in VR applications).

In some embodiments, display 600 may represent a physical display that is presented to user 202 via electronic device 200. For example, display 600 may include an actual physical display rather than a computer-generated simulation of the display. In this case, as described above with respect to display 204 of FIG. 2A, display 600 may be presented to user 202 such that user 202 may view the physical display, instead of viewing a computer-generated simulation of the physical display. In yet other embodiments, presenting the physical display to user 202 may be performed by superimposing a photorealistic image and/or video of the physical display on a simulated environment.

As shown in FIG. 6A, display 600 may include regions 601, 602, and 603. In some embodiments, some, or all, of regions 601, 602, and 603 may be regions in representations of a physical display (e.g., virtual displays), or may be physical displays. In these embodiments, display 600 may represent an aggregated display comprising more than one display. As such, regions 601, 602, and 603 may be determined to be in different representations of physical displays. For example, region 601 may be included in a representation of a first physical display, region 602 may be included in a representation of a second physical display, and region 603 may be included in a representation of a third physical display.

In some embodiments, display 600 may be a representation of a single, continuous display (e.g., virtual display or physical display). In these embodiments, regions 601, 602, and 603 may be determined to be regions in the same representation of a physical display.

A first representation 620 of a system bar may be displayed by electronic device 200 in a region of display 600. For example, first representation 620 may be displayed on region 603 of display 600. In embodiments, first representation 620 may be displayed at any location within region 603. For example, although first representation 620 is shown as displayed at the bottom of region 603, first representation 620 may be displayed at the top, left, right, center, etc., of region 603. In embodiments, the location of first representation 620 in region 603 may be determined by system preferences and/or settings or may be determined by a user (e.g., user 202), who may position the system bar at a particular location within region 603.

A system bar, as used herein, may refer to a portion (e.g., strip) of a display area that may be used to display system elements such as system information (e.g., notifications, statuses (e.g., of opened applications), etc.), provide navigation of functions and files within the system, display selectable elements for opening applications (e.g., icons, affordances, etc.), display selectable elements for selecting opened applications (e.g., icons, affordances, etc.), provide application-specific options and/or functions (e.g., when provided in association with a text editor the system bar may present options to open/close/save a file, etc.). In some embodiments, a system bar is a menu with multiple options. In some embodiments, selection of each option in the menu causes an electronic device to perform different operations.

In embodiments, an input mechanism may be included to facilitate user interaction. For example, the input mechanism may include a mechanism for a user (e.g., user 202) to interact with display 600. In embodiments, the input mechanism may include a representation of an appendage of the user (e.g., a representation of a finger, hand, leg, foot, etc.), a user's gaze (e.g., head gaze, eye gaze, etc.), an input device (e.g., a mouse, stylus, pen, touch-sensitive surface, image sensors, etc.), etc. In embodiments, the representation of an appendage of the user may include a virtual representation of the appendage and/or may include data representing characteristics of the appendage (e.g., location, orientation, distance to a particular point, etc.) within the CGR environment. In aspects, the input mechanism may be detected using input sensors (e.g., touch-sensitive surfaces, image-sensors, etc.) configured to perform hand-tracking, head gaze-tracking, eye gaze-tracking, finger-tracking, etc. As shown in FIG. 6A, the input mechanism may include a gaze 650 of user 202, and/or cursor 610.

In embodiments, gaze 650 of user 202 may be detected. Detected gaze 650 may be a head gaze (e.g., the direction in which the user's head is facing), an eye gaze (e.g., the direction in which the user's eyes are looking), a combination thereof, etc. Gaze 650 of user 202 may be determined to be focused, placed, or otherwise directed to a particular region of display 600. For example, gaze 650 of user 202 may be determined to be directed to region 603, where first representation 620 of the system bar is displayed. Alternatively or additionally, cursor 610 may be determined to be located and/or displayed at a location within region 603.

In embodiments, the input mechanism may be moved. For example, gaze 650 of user 202 may be moved, and the movement of gaze 650 may be detected (e.g., using image sensors, etc.). In embodiments, in response to the detected change in the user's gaze, a determination of the direction of the new direction of the gaze may be made.

In one particular example, first representation 620 displayed in region 603 may be translucent (e.g., semi-transparent). In embodiments, a determination that the new direction of gaze 650 is directed to a new location in region 603 that is closer than the previous location at which gaze 650 was directed may cause first representation 620 to transition from being translucent to being opaque. For example, a determination that the change in gaze 650 indicates that gaze 650 is approaching first representation 620 (e.g., based on a determination that the new direction of gaze 650 is a location within a predetermined distance of first representation 620) may cause first representation 620 to become opaque. In embodiments, the opacity of first representation 620 may be based on the distance from the location at which gaze 650 is directed to the location of first representation 620. For example, as gaze 650 gets closer to first representation 620, the opacity of first representation 620 may increase. In embodiments, as gaze 650 moves away from first representation 620, the opacity of first representation 620 may decrease (e.g., first representation 620 may become more translucent). In additional or alternative embodiments, this functionality to vary the opacity of first representation 620 may be based on the movement of cursor 610 toward or away from first representation 620, and may use a similar technique as discussed above with respect to a change in the user's gaze (e.g., gaze 650).

In alternate examples, as illustrated in FIG. 6B, a determination may be made that the new direction of gaze 650 may be directed to a region that is different than region 603, such as directed to region 602, as illustrated in FIG. 6B. In aspects, a representation of the system bar may not currently be displayed in region 602. As such, the user's gaze (e.g., gaze 650) may be detected in region 602, region 602 being different from region 603 in which first representation 620 may currently be displayed. The detection of gaze 650 may be determined to be an event in region 602 of display 600. It is noted that, in some embodiments, rather than detecting a movement of the user's gaze from region 603 of the display to region 602, the user's gaze may be detected in region 602 without detecting the actual movement of the user's gaze from region 603. In other words, whether gaze 650 has moved from region 603 to region 602 may not be detected, but gaze 650 may be detected as directed to region 602. It is noted that, in embodiments, detecting the event in region 602 of display 600, and also the further steps described below, may occur while the system bar is not selected. For example, the detecting gaze 650 on region 602, and subsequently displaying a second representation of the system bar, may occur without user 202 selecting and/or interacting with the system bar (e.g., via first representation 620).

In some embodiments, detecting that gaze 650 is directed to a particular region may include a determination that gaze 650 has remained directed to a location within the particular region for at least a predetermined period of time. For example, a determination may be made that gaze 650 has remained directed to region 602 for a period of time that is less than the predetermined period of time (e.g., the direction of gaze 650 is moved to a different direction before the predetermined period of time expires). In this case, an event in region 602 may not be determined to occur. When it is determined that gaze 650 has remained directed to region 602 for a period of time that is at least the same as the predetermined period of time (e.g., the direction of gaze 650 does not move to a different direction before the predetermined period of time expires), an event in region 602 may be determined to be detected.

In embodiments, in response to detecting the event in region 602, a determination is made as to whether the event meets a system bar movement criteria or not. In the example illustrated in FIG. 6B, the event in region 602 may be determined to meet the system bar movement criteria when the event in region 602 is determined to be a user's gaze (e.g., gaze 650) detected in region 602.

In response to a determination that the event in region 602 meets the system bar movement criteria (e.g., gaze 650 is detected in region 602), a second representation (e.g., second representation 621) of the system bar is displayed in region 602, as shown in FIG. 6B. In embodiments, second representation 621 may have the same size as first representation 620. In embodiments, second representation 621 may be similar to first representation 620. For example, second representation 621 may include the same theme, the same information, the same interactive elements (e.g., application icons, affordances, etc.), etc. In some embodiments, second representation 621 may be different from first representation 620.

In embodiments, first representation 620 may continue to be displayed in region 603 while second representation 621 is displayed in region 602. In some embodiments, first representation 620 may be displayed as translucent in region 603 while second representation 621 is displayed in region 602. In these embodiments, first representation 620 may transition from translucent to opaque when gaze 650 is determined to move back to region 603. In other embodiments, first representation 620 may cease to be displayed in region 603 while second representation 621 is displayed in region 602.

In some embodiments, second representation 621 may be displayed in region 602 in the same orientation and/or in the same area as first representation 620 in region 603. For example, first representation 620 may be displayed as a horizontal bar across the bottom of region 603. In this case, second representation 621 may be displayed as a horizontal bar across the bottom of region 602. It will be appreciated that the description of first representation 620 and second representation 621 as being displayed on the bottom of their respective regions is for illustrative purposes and not by way of limitation. Thus, in embodiments, first representation 620 and second representation 621 may be displayed at any of the bottom, top, left, and/or right side of their respective regions. In embodiments, second representation 621 may be displayed in a different orientation and/or in a different area as first representation 620 in region 603.

Alternatively or additionally, the input mechanism may include cursor 610. In these implementations, as shown in FIG. 6B, cursor 610 may be moved from a location in region 603 to a location in region 602. The movement of cursor 610 from region 603 to region 602 may be detected (e.g., using input sensors, image sensors, etc.). In embodiments, the detection of cursor 610 in region 602 may be determined to be an event in region 602 of display 600. It is noted that, in some embodiments, rather than detecting a movement of cursor 610 from region 603 of the display to region 602, cursor 610 may be detected in region 602 without detecting the actual movement of cursor 610 from region 603. In other words, whether cursor 610 has moved from region 603 to region 602 may not be detected, but cursor 610 may be detected in region 602. It is noted that, in embodiments, detecting the event in region 602 of display 600, and also the further steps described below, may occur while the system bar is not selected. For example, the detecting cursor 610 on region 602, and subsequently displaying a second representation of the system bar, may occur without user 202 selecting and/or interacting with the system bar (e.g., via first representation 620).

In embodiments, in response to detecting the event in region 602, a determination may be made as to whether the event meets a system bar movement criteria or not. In the example illustrated in FIG. 6B, the event in region 602 may be determined to meet the system bar movement criteria when the event in region 602 is determined to include detecting cursor 610 being moved to region 602.

In response to a determination that the event in region 602 meets the system bar movement criteria (e.g., cursor 610 being moved to region 602), a second representation (e.g., second representation 621) of the system bar is displayed in region 602, as shown in FIG. 6B, and as discussed above.

It is noted that although the foregoing examples, and the examples that follow, may be focused on a description of specific events detected in a second region of the display (e.g., detecting a user's gaze in the second region, detecting a cursor being moved to the second region, and/or interacting with a selectable element in the second region), this is done for illustrative purposes and is not intended to be limiting in any way. In some embodiments, other events may be detected, and these events may be determined to meet a system movement criteria or not. As will be appreciated, any event indicating a potential and/or actual interaction by a user with the second region (e.g., interaction with UI elements in the second region) may be considered and/or may trigger an event in the second region.

Figure 7A:
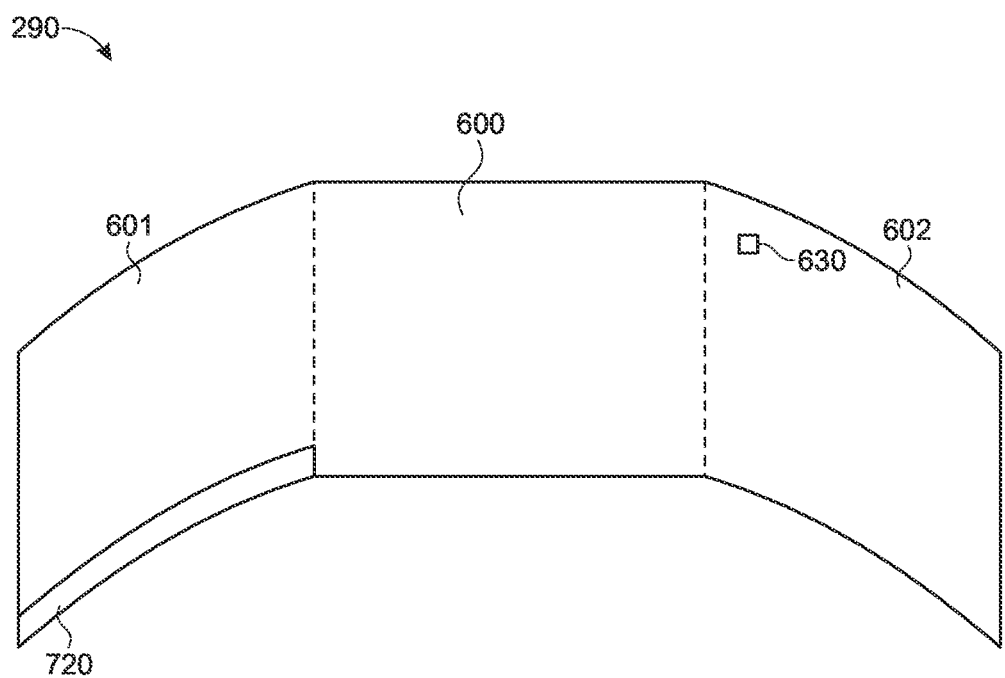
FIGS. 7A and 7B depict another example of techniques for controlling the displaying of representations of a system bar in a display within a CGR environment in accordance with aspects of the present disclosure.
Figure 7B:
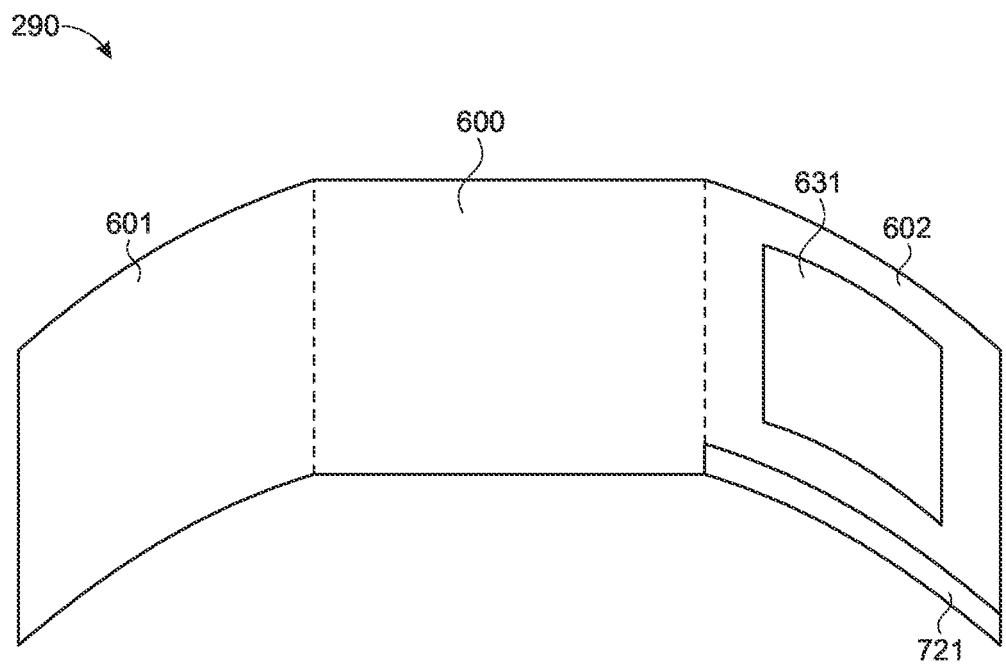

FIGS. 7A and 7B illustrate another example of techniques for controlling the displaying of representations of a system bar in a display within a CGR environment in accordance with aspects of the present disclosure. In particular, FIGS. 7A and 7B illustrate an example in which the displaying of representations of a system bar is controlled based on an event that meets a system bar movement criteria that include an interaction with a selectable UI element.

FIG. 7A illustrates CGR environment 290 including display 600. As discussed above, display 600 may be a representation of a display (e.g., a virtual representation of a physical display), a display area, or a physical display. Display 600 may include regions 601, 602, and 603. As also discussed above, in some embodiments, some, or all, of regions 601, 602, and 603 may be regions in representations of a physical display (e.g., virtual displays), or may be physical displays. In some embodiments, display 600 may be a representation of a single, continuous display (e.g., virtual display or physical display), and regions 601, 602, and 603 may be determined to be regions in the same representation of a physical display.

As shown in FIG. 7A, a first representation 720 of a system bar may be displayed by electronic device 200 in the bottom area of region 601. In embodiments, first representation 720 may be displayed at any location within region 601 (e.g., bottom, top, left, right, center, etc.), as described above. In embodiments, a representation of the system bar may not currently be displayed in region 602.

Selectable UI element 630 may be displayed in region 602 of display 600. In embodiments, region 602 may include a plurality of selectable UI elements, and selectable UI element 630 may be included in the plurality of selectable UI elements. In embodiments, selectable UI element 630 may include an icon, an affordance, a signifier, a button, an interactive UI element, and/or any other UI element configured to allow a user to select the UI element. Selectable UI element 630 may be associated with an application and may be configured to cause, in response to being selected, the associated application to open.

For example, as illustrated in FIG. 7B, a user (e.g., user 202) may interact with selectable UI element 630. In embodiments, the interaction may be determined to indicate a selection of UI element 630. In response to the selection of selectable UI element 630, an associated application (e.g., application 631) may be opened and/or displayed in region 602.

In embodiments, the selection of selectable UI element 630, and/or the opening of application 631 may be detected. In embodiments, the selection of selectable UI element 630, and/or the opening of application 631 may be determined to be an event in region 602 of display 600. It is noted that, in embodiments, detecting the event in region 602 of display 600, and also the further steps described below, may occur while the system bar is not selected (e.g., while a user (e.g., user 202) may not select and/or interact with the system bar (e.g., via first representation 720)).

In embodiments, in response to detecting the event in region 602, a determination is made as to whether the event meets a system bar movement criteria or not. In the example illustrated in FIG. 7B, the event in region 602 may be determined to meet the system bar movement criteria when the event in region 602 is determined to be a selection of a selectable UI element (e.g., selectable UI element 630) in region 602, and/or the opening of an application (e.g., application 631) in region 602.

In response to a determination that the event in region 602 meets the system bar movement criteria (e.g., selection of selectable UI element 630, and/or the opening of application 631 is detected in region 602), a second representation (e.g., second representation 721) of the system bar is displayed in region 602, as shown in FIG. 7B. In embodiments, second representation 721 may have the same size as first representation 720. In embodiments, second representation 721 may be similar to first representation 720. For example, second representation 721 may include the same theme, the same information, the same interactive elements (e.g., application icons, affordances, etc.), etc. In some embodiments, second representation 721 may be different than first representation 720.

In embodiments, the first representation may continue to be displayed in region 601 while second representation 721 is displayed in region 602. In other embodiments, first representation 720 may cease to be displayed in region 601 while second representation 721 is displayed in region 602.

In some embodiments, second representation 721 may be displayed in region 602 in the same orientation (horizontal, vertical, angled, etc.) and/or in the same area (bottom, top, left, and/or right) as first representation 720 in region 601. In embodiments, second representation 721 may be displayed in a different orientation and/or in a different area as first representation 720 in region 601.

Figure 8A:
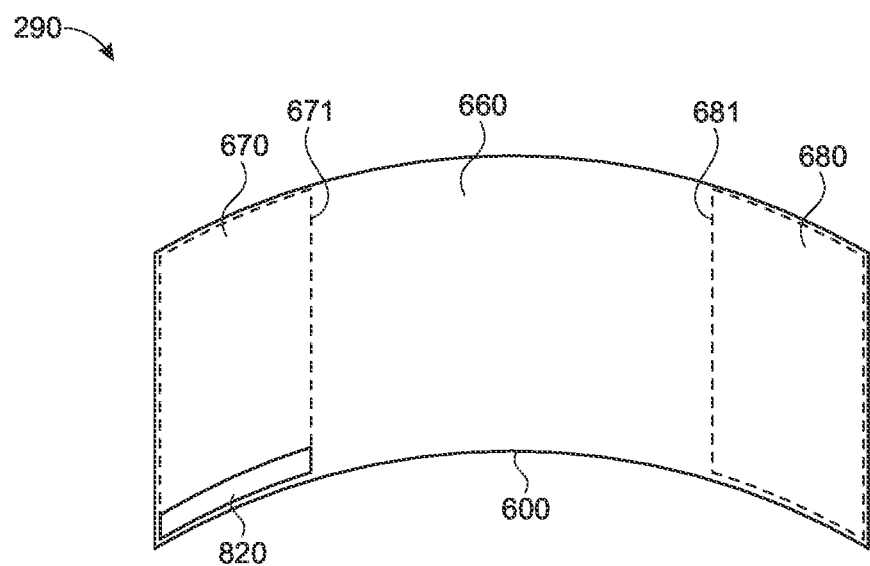
FIGS. 8A and 8B depict yet another example of techniques for controlling the displaying of representations of a system bar in a display within a CGR environment in accordance with aspects of the present disclosure.
Figure 8B:
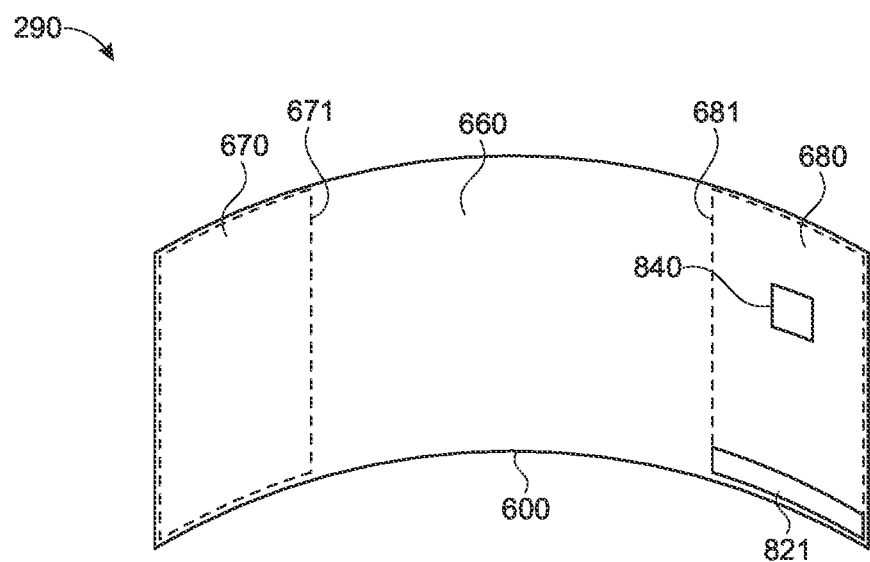

FIGS. 8A and 8B illustrate another example of techniques for controlling the displaying of representations of a system bar in a display within a CGR environment in accordance with aspects of the present disclosure. In particular, FIGS. 8A and 8B illustrate an example in which the displaying of representations of a system bar in regions of a representation of a display is controlled based on a detected event that meets a system bar movement criteria.

FIG. 8A illustrates CGR environment 290 including display 600. As discussed above, display 600 may be a representation of a display (e.g., a virtual representation of a physical display), a display area, or may be a physical display. In embodiments, display 600 may represent a single display or may represent an aggregated display comprising more than one display. In the example illustrated in FIG. 8A, display 600 may be a representation of a single display. Display 600 may include regions 670 and 680. Regions 670 and 680 may be regions within the single representation of display 600. Regions 670 may be defined by border 671, and region 680 may be defined by border 681. In aspects, borders 671 and 681 may not be displayed on display 600 or may be displayed in display 600.

In aspects, display 600 may be a curved display. In some embodiments, display 600 may have a size such that display 600 may partially or fully surround a user (e.g., user 202) located in front of display 600, such that the user may perceive display 600 as a display surrounding him or her.

As shown in FIG. 8A, a first representation 820 of a system bar may be displayed by electronic device 200 in the bottom area of region 670. In embodiments, first representation 820 may be displayed at any location within region 670 (e.g., bottom, top, left, right, center, etc.), as described above. In embodiments, a representation of the system bar may not currently be displayed in region 680.

FIG. 8B illustrates event 840 being detected in region 680 of display 600. In embodiments, event 840 may be an event indicating a potential and/or actual interaction by a user (e.g., user 202) with region 680. In embodiments, a determination may be made as to whether event 840 meets a system bar movement criteria or not. For example, a determination may be made as to whether event 840 is at least one of a detection of a user's gaze in region 680, a detection of a cursor being moved into region 680, an detection of an interaction with a selectable element in region 680, opening of an application in region 680, any other event indicating a potential and/or actual interaction by a user with region 680, and/or any combination thereof.

It is noted that, in embodiments, detecting event 840 in region 680 of display 600, and also the further steps described below, may occur while the system bar is not selected (e.g., while a user (e.g., user 202) may not select and/or interact with the system bar (e.g., via first representation 720)).

In response to a determination that event 840 in region 680 meets a system bar movement criteria, a second representation (e.g., second representation 821) of the system bar is displayed in region 680, as shown in FIG. 8B. In embodiments, second representation 821 may have the same size as first representation 820. In embodiments, second representation 821 may be similar to first representation 820. For example, second representation 821 may include the same theme, the same information, the same interactive elements (e.g., application icons, affordances, etc.), etc. In some embodiments, second representation 821 may be different than first representation 820.

In some embodiments, second representation 821 may be displayed in region 680 in the same orientation (horizontal, vertical, angled, etc.) and/or in the same area (bottom, top, left, and/or right) as first representation 820 in region 670. In embodiments, second representation 821 may be displayed in a different orientation and/or in a different area as first representation 820 in region 670.

In embodiments, first representation 820 may continue to be displayed in region 670 while second representation 821 is displayed in region 680. In other embodiments, first representation 820 may cease to be displayed in region 670 while second representation 821 is displayed in region 680.

In some embodiments, second representation 821 may be displayed at a location within region 680 based on the location of event 840. For example, event 840 may be detected in region 680 and may be determined to be at a particular location within region 680 (e.g., location in region 680 at which a user's gaze may be directed, location in region 680 to which a cursor may be moved, location in region 680 of a UI element with which a user may interact, location in region 680 at which an application may be opened, etc. In these embodiments, second representation 821 may be displayed at the location within region 680 in which event 840 may be detected. In other embodiments, second representation 821 may be displayed at either the bottom, top, right, or left side of region 680 regardless of the location within region 680 in which event 840 may be detected.

Figure 9:
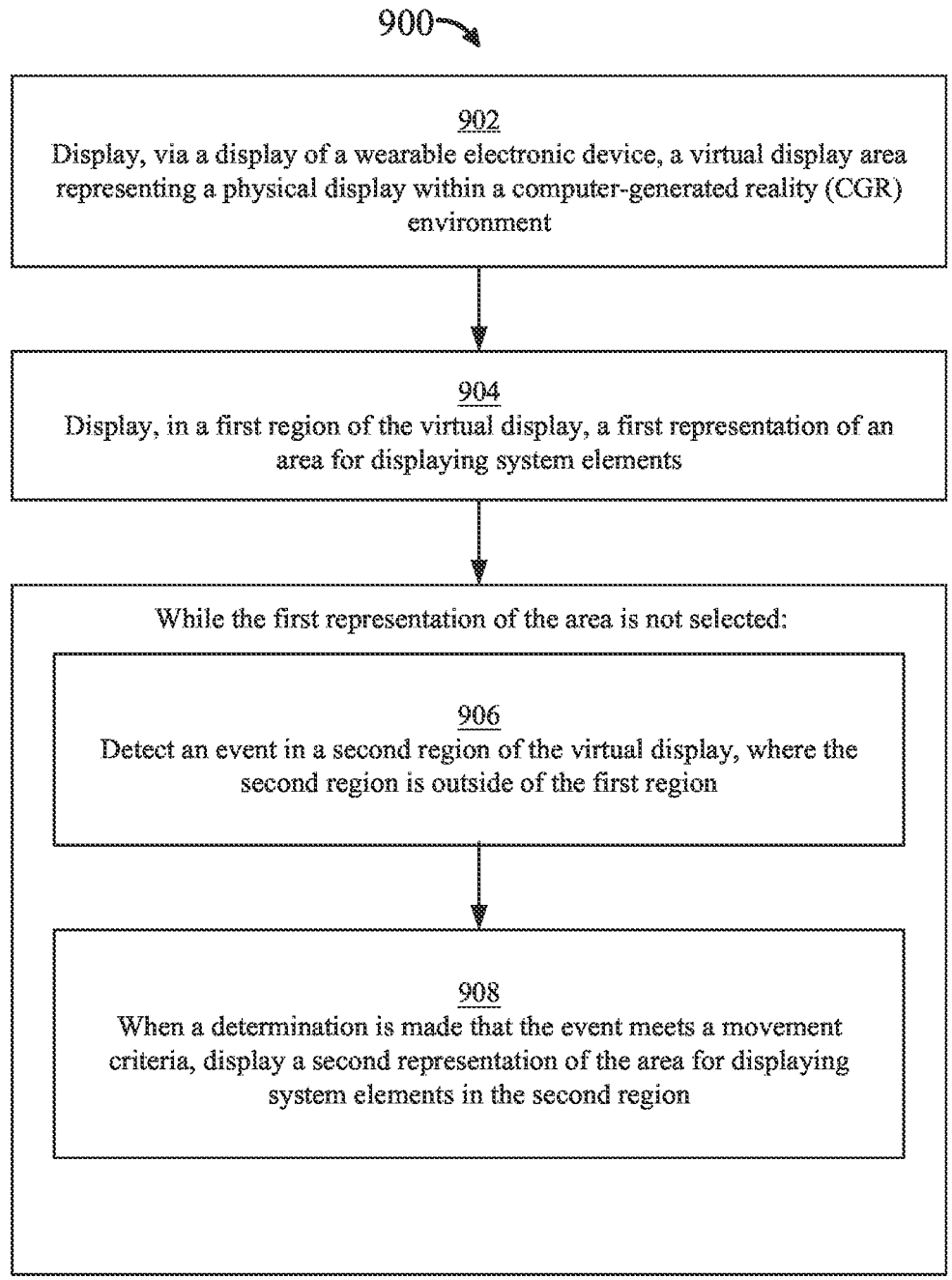
FIG. 9 is a flow diagram illustrating a method executed to implement aspects of the present disclosure.

FIG. 9 is a flow diagram illustrating method 500 for controlling the displaying of representations of a system bar in a display within a CGR environment. In some embodiments, method 900 may be performed by system 100 or a portion of system 100. In some embodiments, method 900 may be performed by one or more external systems and/or devices. In some embodiments, method 900 may be performed by system 100 (or a portion of system 100) in conjunction with one or more external systems and/or devices.

At block 902, the system displays, via a display of an electronic device (e.g., a wearable electronic device, an HMD device, etc.), a virtual display area representing a physical display within a CGR environment. For example, a virtual display area representing a physical display may be displayed via a first display (e.g., a left eye display panel) or second display (e.g., a second eye display panel) of an electronic device.

In aspects, the virtual display area may represent a curved display. In some embodiments, the virtual display area may represent a curved display having a size such that the display may partially or fully surround a user located in front of the represented display, such that the user may perceive the display as a display surrounding him or her.

In embodiments, the virtual display area may be a representation of a single, continuous physical display. In other embodiments, the virtual display area may be a representation of more than one physical display (e.g., an aggregation of more than one physical display). In embodiments, the virtual display area may include at least one region configured for displaying UI elements and for displaying a representation of a system bar.

At block 904, the system displays a first representation of a system bar in a first region of the virtual display. In embodiments, the first representation of the system bar may be a virtual representation displayed within the CGR environment. In embodiments, the first representation may be displayed at any location within the first region (e.g., bottom, top, left, right, center, etc.). In embodiments, a representation of the system bar may not currently be displayed in another region of the virtual display area. In embodiments, the system bar may include a plurality of affordances, icons, and/or selectable UI elements.

At block 906, the system detects an event in a second region of the virtual display. In aspects, the second region of the virtual display may be outside of the first region of the virtual display. In embodiments, the detected event may be an event indicating a potential and/or actual interaction by a user with the second region. In embodiments, a determination may be made as to whether the event meets a system bar movement criteria or not. For example, a determination may be made as to whether the event is at least one of a detection of a user's gaze in the second region, a detection of a cursor being moved into the second region, a detection of an interaction with a selectable element in the second region, opening of an application in the second region, any other event indicating a potential and/or actual interaction by a user with the second region, and/or any combination thereof.

At block 908, the system displays a second representation of the system bar in the second region when a determination is made that the event meets the system bar movement criteria. In embodiments, detecting the event in the second region and displaying the second representation of the system bar when the event meets the system bar movement criteria may occur while the system bar is not currently selected (e.g., while a user (e.g., user 202) may not select and/or interact with the system bar (e.g., via the first representation)).

In embodiments, the second representation of the system bar may have the same size as the first representation. In embodiments, the second representation may be similar to the first representation (e.g., the second representation may include the same theme, the same information, the same interactive elements (e.g., application icons, affordances, etc.), etc., as the first representation). In some embodiments, the second representation may be different from the first representation.

In some embodiments, the second representation may be displayed in the second region in the same orientation (horizontal, vertical, angled, etc.) and/or in the same area (bottom, top, left, and/or right) as the first representation in the first region. In embodiments, the second representation may be displayed in a different orientation and/or in a different area from the first representation in the first region.

In embodiments, the first representation may continue to be displayed in the first region while the second representation is displayed in the second region. In other embodiments, the first representation may cease to be displayed in the first region while the second representation is displayed in the second region.

In embodiments, the first representation may continue to be displayed in the first region as a translucent object, while the second representation may be displayed in the second region as an opaque object. In embodiments, the first representation may transition from translucent to opaque when a user's gaze or a cursor is determined to move into the first region.

Aspects of the present disclosure are directed to systems and techniques that provide functionality for controlling the displaying of a virtual display window based on a hinge angle of a physical device within a CGR environment. In embodiments, controlling whether a virtual display window is manifested (e.g., displayed within the CGR environment) may include displaying the virtual display window adjacent to the physical device (e.g., adjacent to a display of the physical device) when a hinge angle of the physical device reaches a threshold hinge angle.

FIGS. 10A-10J illustrate exemplary techniques for controlling the displaying of a virtual display window based on a hinge angle of a physical device within a CGR environment in accordance with aspects of the present disclosure.

Figure 10A:
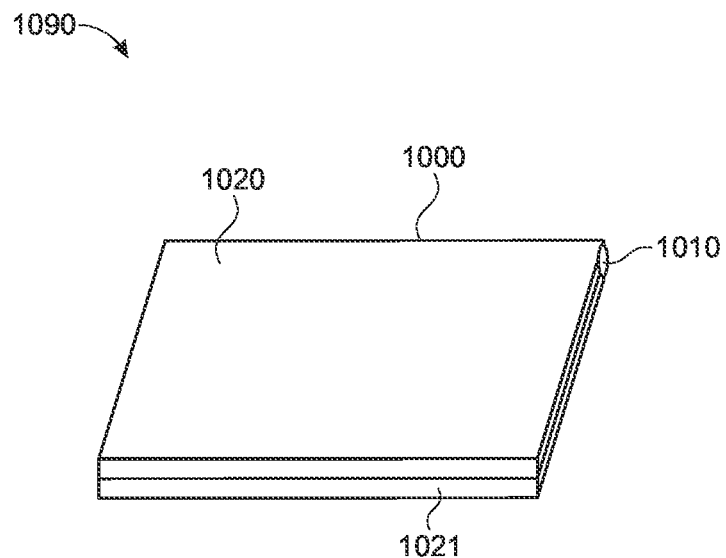
FIGS. 10A-10J depict exemplary techniques for controlling the displaying of a virtual display window based on a hinge angle of a physical device within a CGR environment in accordance with aspects of the present disclosure.

FIG. 10A illustrates physical device 1000 within CGR environment 1090. In embodiments, physical device 1000 may be a device with a hinging functionality, in which at least two portions of the physical device may be configured to turn about a hinge point and come together or separate from each other. For example, physical device 1000 may include portion 1020 and portion 1021, both of which may be configured to hinge about hinge point 1010. In embodiments, portions 1020 and 1021 may separate from each other while remaining attached at hinge point 1010. In embodiments, physical device 1000 may be any device with such hinging functionality (e.g., a laptop, a smartphone, a folding tablet, a briefcase, etc.).

In embodiments, physical device 1000 may be part of CGR environment 1090. For example, as discussed above, physical device 1000 may be presented (e.g., to a user (e.g., user 202)) via a transparent or translucent display of electronic device 200, or may be presented via pass-through video as described above, such that the actual physical device 1000 may be perceived.

Figure 10B:
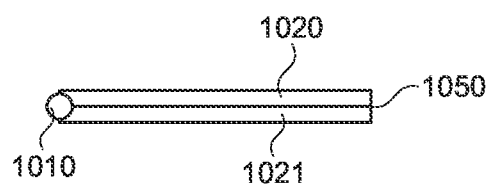

In embodiments, a hinge angle of physical device 1000 may be measured by measuring the angle of the separation between portion 1020 and portion 1021. For example, as shown in FIG. 10B, a current hinge angle of physical device 1000 may be determined to be zero. That is, portion 1020 and portion 1021 may be together.

Figure 10C:
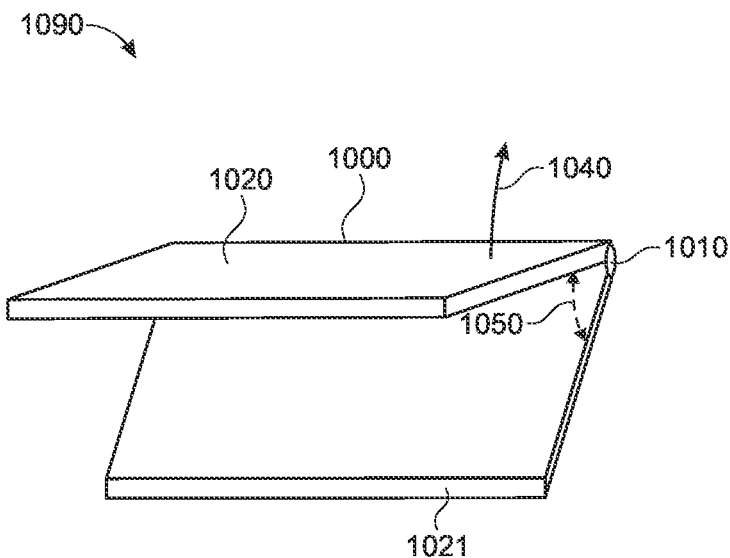

FIG. 10C illustrates a hinge action upon physical device 1000. In embodiments, either portion 1021 or portion 1021, or both, may hinge about hinge point 1010 to separate from each other. In the example illustrated in FIG. 10C, portion 1020 may hinge about hinge point 1010 in direction 1040 away from portion 1021. For example, physical device 1000 may be determined to be opened by the hinging action of portion 1020 away from portion 1021. The hinging action may create hinge angle 1050 between portions 1020 and 1021.

Figure 10D:
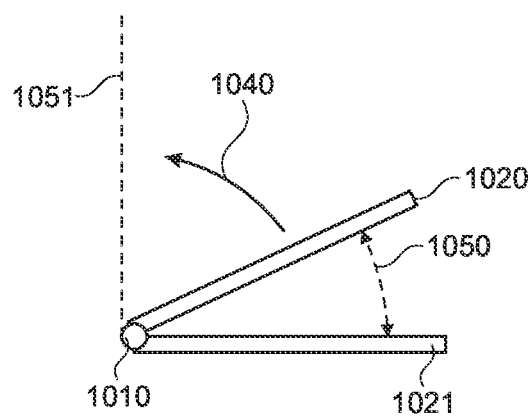

FIG. 10D illustrates the hinging action of portion 1020 rotating about hinge point 1010 and moving away from portion 1021, thereby creating current hinge angle 1050 between portion 1020 and portion 1021. In embodiments, current hinge angle 1050 may be measured. For example, image sensors may be used to track the location of portions 1020 and 1021 relative to each other to measure current hinge angle 1050. In other implementations, sensors in physical device 1000 may be used to measure current hinge angle 1050, and physical device 1000 may provide data representative of the hinge angle to device 200.

In embodiments, threshold hinge angle 1051 may be provided. Threshold hinge angle 1051 may be a predetermined hinge angle against which the current hinge angle may be measured. In embodiments, threshold hinge angle 1051 may be an angle with respect to portion 1021, portion 1021 being a bottom portion of physical device 1000. In embodiments, threshold hinge angle 1051 may be displayed as a virtual object within CGR environment (e.g., as a line, broken line, point, etc.). In some embodiments, threshold hinge angle 1051 may not be displayed.

In embodiments, a determination may be made as to whether the measured current hinge angle exceeds the threshold hinge angle or not. For example, current hinge angle 1050 may be compared against threshold hinge angle 1051 to determine if current hinge angle 1050 exceeds threshold hinge angle 1051 or not. When a determination is made that the current hinge angle does not exceed the threshold hinge angle, a virtual display window may not be manifested. In embodiments, not manifesting the virtual display window may include forgoing to display the virtual display window in accordance with the description below. Conversely, when a determination is made that the measured hinge angle exceeds the threshold hinge angle, a virtual display window may be manifested.

As illustrated in FIGS. 10C and 10D, current hinge angle 1050 does not exceed threshold hinge angle 1051. In accordance with the determination that current hinge angle 1050 does not exceed threshold hinge angle 1051, a virtual display window may not be manifested.

Figure 10E:
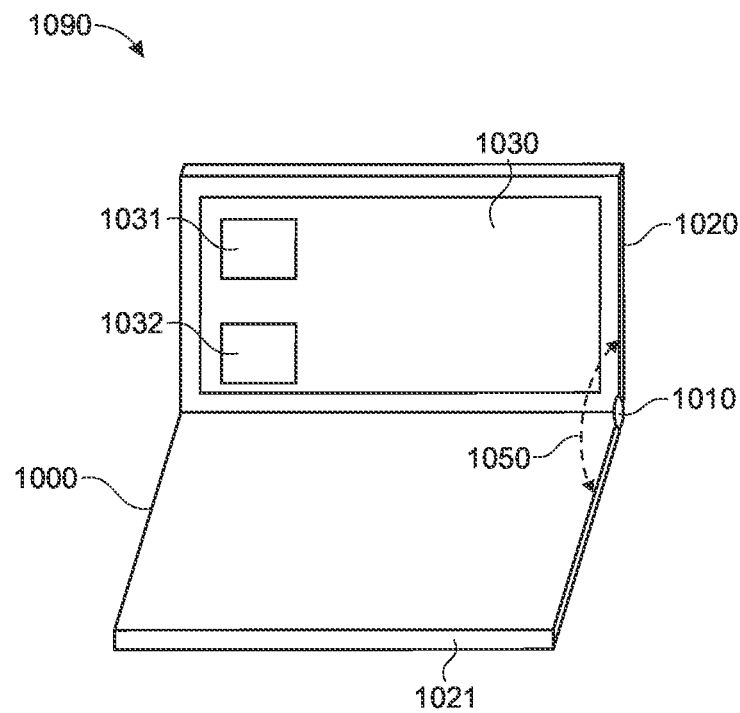
Figure 10F:
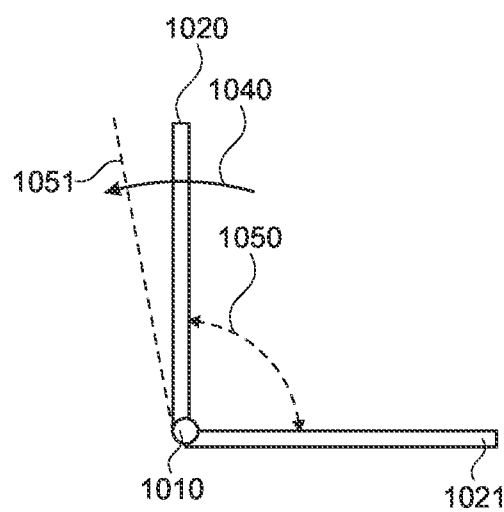

FIGS. 10E and 10F illustrate a further hinging action of portion 1020 rotating about hinge point 1010 and moving further away from portion 1021 in direction 1040. In this example, current hinge angle 1050 has increased. In embodiments, a determination may be made as to whether current hinge angle 1050 now exceeds threshold hinge angle 1051 or not. For example, current hinge angle 1050 may be compared against threshold hinge angle 1051 to determine in current hinge angle 1050 exceeds threshold hinge angle 1051 or not. As illustrated in FIGS. 10E and 10F, current hinge angle 1050 does not exceed threshold hinge angle

1051. In accordance with the determination that current hinge angle 1050 does not exceed threshold hinge angle 1051, a virtual display window may not be manifested.

In some embodiments, physical device 1000 may be configured with a display (e.g., display 1030. Physical device 1000 may also be configured such that display 1030 may be inactive and/off (e.g., not displaying content or displaying wholly dark or black screen) until a particular hinge angle has been reached. When the hinge angle of physical device 1000 reaches the particular hinge angle, display 1030 may be turned on or activated. In the example illustrated in FIG. 10E, hinge angle 1050, while perhaps not exceeding threshold hinge angle 1051, has reached the hinge angle to activate display 1030. In this case, display 1030 may be activated. In embodiments, activating display 1030 may include displaying at least a portion of content in display 1030. For example, display 1030 may be activated, and content 1031 and content 1032 may be displayed in display 1030. In embodiments, content 1031 and content 1032 may be different contents, may be portions of a content or may be different portions of the same content.

Figure 10G:
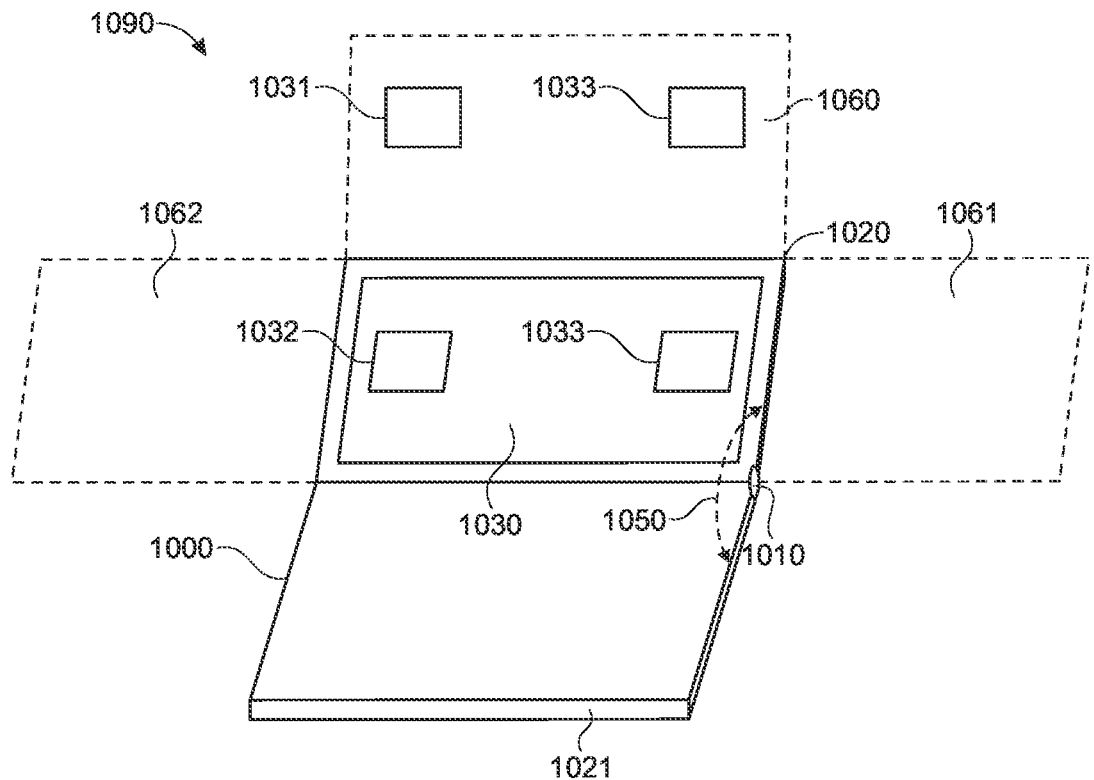
Figure 10H:
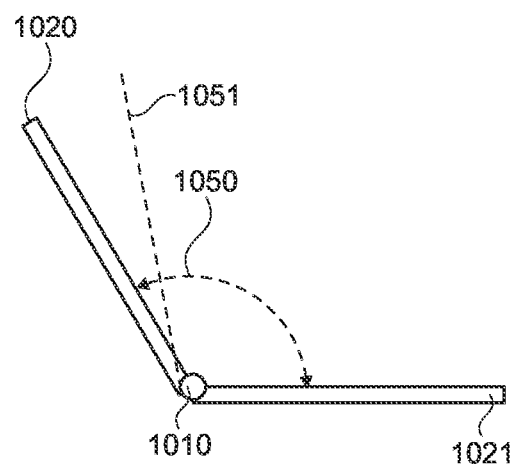

FIGS. 10G and 10H illustrates a yet further hinging action of portion 1020 rotating about hinge point 1010 and moving even further away from portion 1021. In this example, current hinge angle 1050 has increased further. In embodiments, a determination may be made as to whether current hinge angle 1050 now exceeds threshold hinge angle 1051 or not. For example, current hinge angle 1050 may be compared against threshold hinge angle 1051 to determine in current hinge angle 1050 exceeds threshold hinge angle 1051 or not. As illustrated in FIGS. 10E and 10F, current hinge angle 1050 exceeds threshold hinge angle 1051. In accordance with the determination that current hinge angle 1050 exceeds threshold hinge angle 1051, a virtual display window may be manifested.

In embodiments, manifesting a virtual display window may include displaying at least one virtual display window within CGR environment 1090 relative to the physical device. In embodiments, the virtual display window may be displayed at any region within CGR environment 1090 that facilitates configuring the virtual display window as connected to the physical device. In embodiments, for example, where the physical device may not have a display, the virtual display window may be displayed to represent a display of the physical device. In some embodiments, for example, where the physical device may have a display, the virtual display window may be displayed as connected to a display of the physical device (e.g., as an extension of the display of the physical device). In embodiments, the size of the virtual display window may be the same as the size of the display of the physical device. In other embodiments, the size of the virtual display window may be different from the size of the display of the physical device. In these cases, the size of the virtual display window may be determined based on system preferences and/or settings, and/or may be determined based on environmental characteristics. For example, the size of the virtual display window may be determined to accommodate a desk (e.g., a virtual desk, or physical desk) within the CGR environment where physical device 1000 may be laid.

In the example illustrated in FIG. 10G, virtual display window 1060 may be displayed, when it is determined that current hinge angle 1050 exceeds threshold hinge angle 1051, in a region above the physical device 1000 and connected to display 1030 of physical device 1000. In this example, virtual display window 1060 extends display 1030 upwards. In some embodiments, additional virtual display windows may be displayed. For example, virtual display window 1061 may be displayed to the left of physical device 1000 to extend display 1030 leftwards, and/or virtual display window 1062 may be displayed to the right of physical device 1000 to extend display 1030 rightwards. As will be appreciated, additional or less virtual display windows may be displayed. For example, in embodiments, additional virtual display windows may be displayed such that an entire region comprising the virtual display windows and physical display 1030 represent a single, coherent, extended display.

In embodiments, displaying virtual display window 1060, and ceasing to display virtual display window 1060 as described below, may be performed gradually. In embodiments, displaying virtual display window 1060 may include initially displaying virtual display window 1060 with a high transparency (e.g., non-zero transparency) and gradually decreasing the transparency of virtual display window 1060 until virtual display window 1060 is rendered opaque. In some embodiments, the transparency of virtual display window 1060 may depend on the hinge angle of physical device 1000. In embodiments, the size of virtual display window 1060 may also be increased gradually, and in some embodiments, the size of virtual display window 1060 may depend on the hinge angle.

In embodiments, at least a portion of the content displayed in display 1030 of physical device 1000 may be displayed in the virtual display window. For example, as shown in FIG. 10G, content 1031, which was previously displayed in display 1030, may be displayed in virtual display window 1060. In embodiments, which portion of content previously displayed in the display of the physical device may be displayed in the virtual display window may be determined automatically upon the display of the virtual window. For example, content 1031 and content 1032 may be portions of content that represents a coherent element (e.g., an image, an application window, etc.). In this case, when virtual display window 1060 is displayed in response to the hinge angle of physical device 1000 exceeding threshold hinge angle 1051, the coherent element may be increased in size, portion 1031 may be moved to virtual display window 1060, and portion 1031 may remain displayed in display 1030. In embodiments, content 1031 and content 1032 may not be portions of content that represents a coherent element, but nevertheless, at least a portion of the content may be moved to virtual display window 1060. In some embodiments, a user (e.g., user 202) may select content to move to virtual display window 1060.

In embodiments, content may be displayed in the virtual display window that was not previously displayed in the display of the physical device. For example, content 1033 may not previously be displayed in display 1030 of physical device 1000. In this case, when virtual display window 1060 is displayed in response to the hinge angle of physical device 1000 exceeding threshold hinge angle 1051, content 1033 may be displayed in virtual display window 1060.

In embodiments, content displayed in the virtual window may be concurrently displayed (e.g., shared) in the physical display. For example, content 1033 may be displayed in display 1030 of physical device 1000. In response to a user input (e.g., a selection of an interactive element, a dragging gesture, a click, etc.), content 1033 may be concurrently displayed (e.g., shared) in physical display 1030. In this manner, a user viewing CGR environment 1090, and who may perceive virtual display window 1060 via device 200, may share virtual content from the CGR environment, via the real-world physical display (e.g., display 1030), to other users who may not be able to perceive CGR environment 1090.

In embodiments, virtual display window 1060 may be displayed a particular tilt angle with respect to physical device 1000. In embodiments, the tilt angle of virtual display window 1060 may be the same as the hinge angle of portion 1020. In other embodiments, the tilt angle of virtual display window 1060 may be fixed and/or predetermined. In these cases, even if the hinge angle of physical device changes, the tilt angle of virtual display window 1060 may remain the same (e.g., as long as the hinge angle of the physical device exceeds the threshold hinge angle).

Figure 10I:
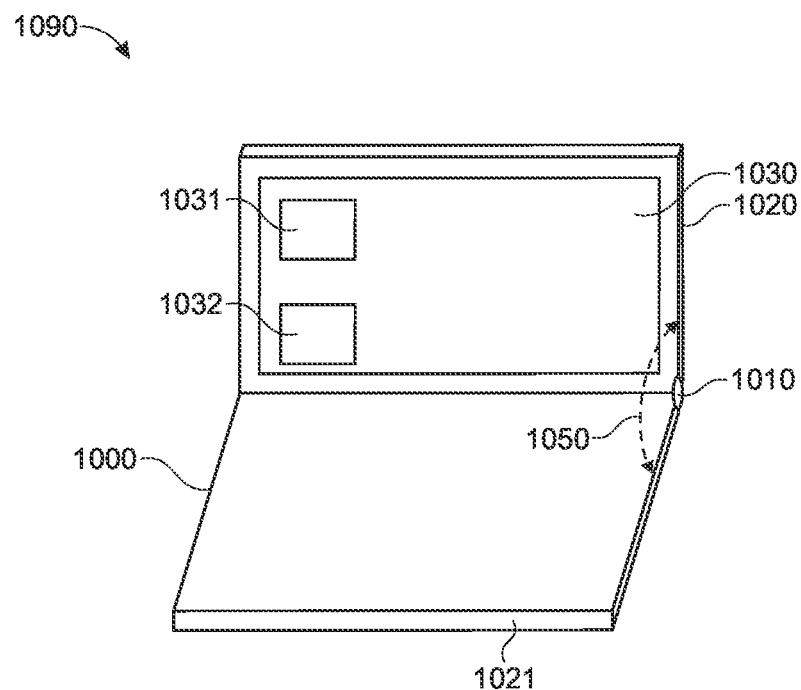
Figure 10J:
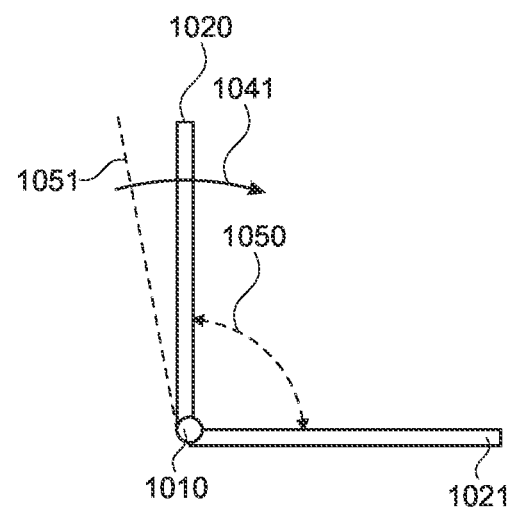

FIGS. 10I and 10J illustrate a hinging action in which portion 1020 rotates about hinge point 1010 in direction 1041 towards portion 1021. In this example, based on direction 1041, it may be determined that physical device 1000 is being closed. In this example, it may be determined that current hinge angle 1050 has decreased. In embodiments, a determination may be made as to whether current hinge angle 1050 exceeds threshold hinge angle 1051 or not. For example, current hinge angle 1050 may be compared against threshold hinge angle 1051 to determine in current hinge angle 1050 exceeds threshold hinge angle 1051 or not. As illustrated in FIG. 10J, current hinge angle 1050 no longer exceeds threshold hinge angle 1051. In accordance with the determination that current hinge angle 1050 does not exceed threshold hinge angle 1051, the displaying of the virtual display window (e.g., virtual display window 1060, 1061, 1062, and/or any combination thereof) is ceased.

In embodiments, ceasing to display the virtual display window may include moving at least a portion of the content displayed in the virtual display window to display 1030 of physical device 1000. In embodiments, the content that is moved to display 1030 may include content that was previously displayed in display 1030 but was moved to the virtual display window, and/or may include content that was displayed in the virtual display window but not previously displayed in display 1030.

In embodiments, as described above, ceasing to display the virtual display window may be performed gradually. For example, the transparency of the virtual display window may be gradually increased until the virtual display window ceases to be visible. In alternative or additional embodiments, ceasing to display the virtual display window may include gradually decreasing the size of the virtual display window until the window ceases to be visible.

Figure 11:
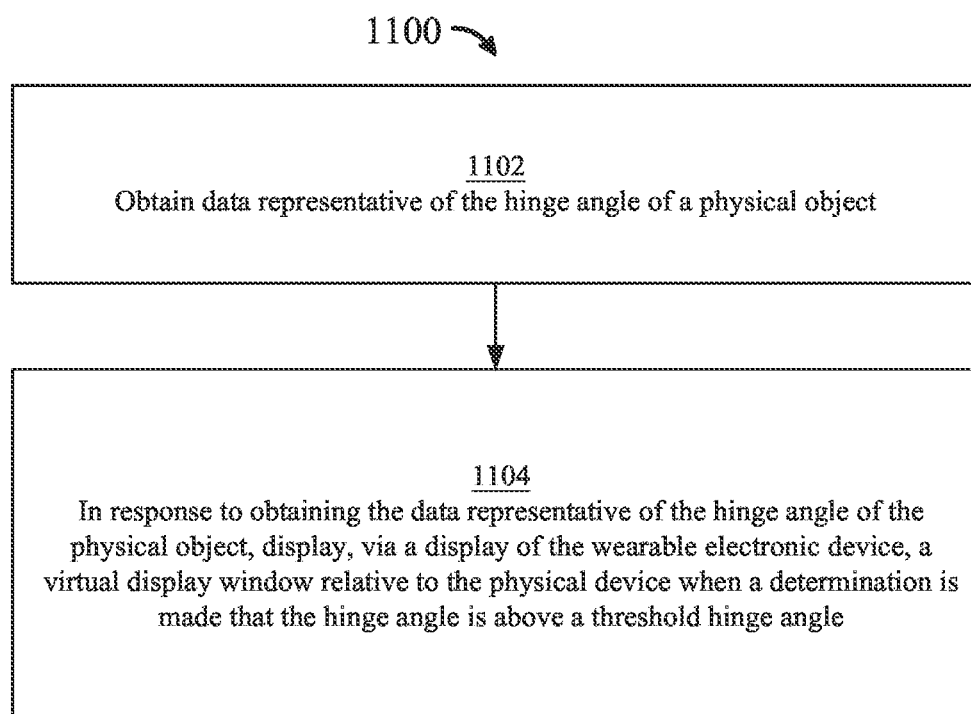
FIG. 11 is a flow diagram illustrating a method executed to implement aspects of the present disclosure.

FIG. 11 is a flow diagram illustrating method 1100 for controlling the displaying of a virtual display window based on a hinge angle of a physical device within a CGR environment. In some embodiments, method 1100 may be performed by system 100 or a portion of system 100. In some embodiments, method 1100 may be performed by one or more external systems and/or devices. In some embodiments, method 1100 may be performed by system 100 (or a portion of system 100) in conjunction with one or more external systems and/or devices. In embodiments, method 1100 may be performed by an electronic device (e.g., a wearable electronic device, an HMD device, etc.).

At block 1102, the system receives and/or obtains data representative of a hinge angle of a physical object. In embodiments, the hinge angle of the physical device may be measured using image sensors, sensors in the physical device, using computer vision techniques that may employ forward-facing camera, etc.

In embodiments, in response to obtaining the data representative of the hinge angle of the physical device, a determination may be made as to whether the hinge angle of the physical device exceeds a threshold hinge angle or not. For example, the hinge angle may be compared against the threshold hinge angle to determine if the hinge angle exceeds the threshold hinge angle or not. When a determination is made that the hinge angle does not exceed the threshold hinge angle, a virtual display window may not be manifested. In embodiments, not manifesting the virtual display window may include forgoing to display the virtual display window.

At block 1104, the system displays, via a display of the electronic device (e.g., a wearable electronic device, an HMD device, etc.), a virtual display window relative to the physical device when a determination is made that the hinge angle exceeds a threshold hinge angle, in response to obtaining the data representative of the hinge angle of the physical device. For example, a virtual display area relative to the physical device may be displayed via a first display (e.g., a left eye display panel) or second display (e.g., a second eye display panel) of an electronic device.

In embodiments, the virtual display window may be displayed at any region within the CGR environment that facilitates configuring the virtual display window to be displayed as connected to the physical device. In embodiments, the virtual display window may be displayed as connected to a display of the physical device (e.g., as an extension of the display of the physical device). In embodiments, the size of the virtual display window may be the same as the size of the display of the physical device. In other embodiments, the size of the virtual display window may be different from the size of the display of the physical device.

In embodiments, the virtual display window may be displayed in a region above the physical device. In some embodiments, additional or alternative virtual display windows may be displayed (e.g., on the left or right of the physical device).

In embodiments, displaying the virtual display window, and ceasing to display the virtual display window, may be performed gradually. For example, displaying the virtual display window may include initially displaying the virtual display window with a high transparency and gradually decreasing the transparency of the virtual display window until the virtual display window is rendered opaque. In embodiments, the size of the virtual display window may be increased gradually until reaching a determined size when the virtual display window is displayed.

In embodiments, at least a portion of the content displayed in a display of the physical device may be displayed in the virtual display window. For example, when the virtual display window is displayed in response to the hinge angle of the physical device exceeding the threshold hinge angle, at least a portion of the content that was previously displayed in the display of the physical device may be moved to the virtual display window.

In embodiments, content displayed in the virtual display window may be concurrently displayed (e.g., shared) in the physical display. For example, in response to a user input (e.g., a selection of an interactive element, a dragging gesture, a click, etc.), content displayed in the virtual display window may be concurrently displayed (e.g., shared) in the display of the physical device. In this manner, a user presented with the CGR environment, and who may perceive the virtual display window via the electronic device, may share virtual content from the CGR environment, via a real-world physical display, to other users who may not be able to perceive the CGR environment.

In embodiments, the virtual display window may be displayed at a particular tilt angle with respect to the physical device. In embodiments, the tilt angle of the virtual display window may be maintained even if the hinge angle and/or a tilt angle of the physical device changes.

In embodiments, in response to detecting that the hinge has changed, a determination may be made as to whether the new hinge angle of the physical device exceeds the threshold hinge angle or not. When a determination is made that the new hinge angle does not exceed the threshold hinge angle, the displaying of the virtual display window may be ceased.

In embodiments, ceasing to display the virtual display window may include moving at least a portion of content displayed in the virtual display window to the display of the physical device. In embodiments, the content that is moved to the display of the physical device may include content that was previously displayed in the display of the physical device but was moved to the virtual display window, and/or may include content that was displayed in the virtual display window but not previously displayed in the display of the physical device.

In embodiments, as described above, ceasing to display the virtual display window may be performed gradually. For example, the transparency of the virtual display window may be gradually increased until the virtual display window ceases to be visible. In alternative or additional embodiments, ceasing to display the virtual display window may include gradually decreasing the size of the virtual display window until the window ceases to be visible.

Aspects of the present disclosure are directed to systems and techniques that provide functionality for controlling the displaying of UI elements based on a gaze within a CGR environment. In embodiments, controlling the displaying of a UI element (e.g., a cursor, an application window, etc.) based on a gaze within a CGR environment may include displaying the UI element at a first position within the CGR environment, detecting a current gaze of a user within the CGR environment, and, upon receiving a request that meets moving criteria, displaying the UI element at a lead-in position and then moving the UI element from the lead-in position to a second position determined based on the user's gaze.

Figure 12A:
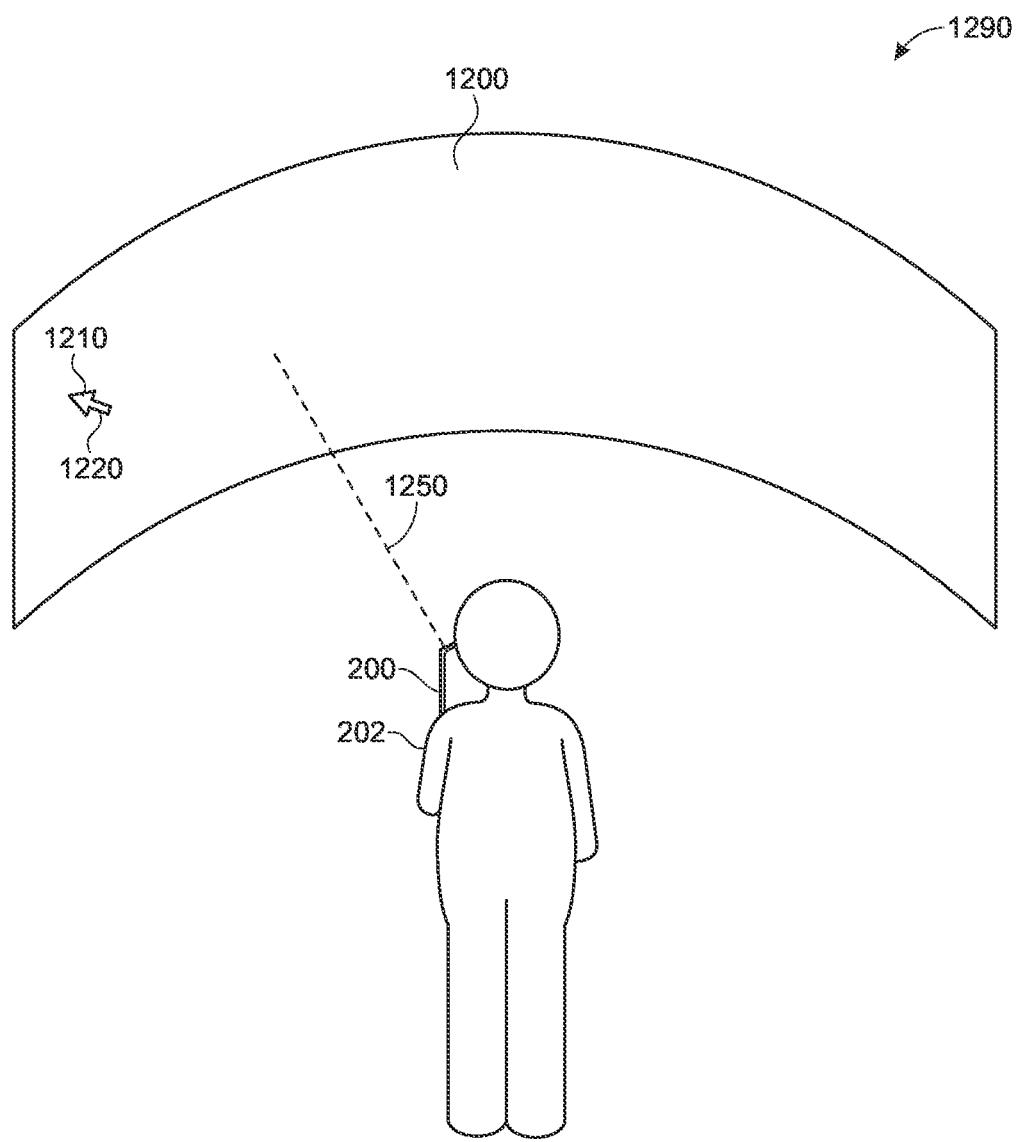
FIGS. 12A-12E depict exemplary techniques for controlling the displaying of UI element based on a gaze within a CGR environment in accordance with aspects of the present disclosure.

FIGS. 12A-12E illustrate exemplary techniques for controlling the displaying of UI element based on a gaze within a CGR environment in accordance with aspects of the present disclosure. In particular, FIG. 12A illustrates user 202 wearing electronic device 200, which is configured to allow user 202 to view CGR environment 1290. As mentioned above, in some embodiments, electronic device 200 may be similar to electronic device 100a described above with reference to FIGS. 1A and 1B.

As illustrated in FIG. 12A, CGR environment 1290 includes display 1200. In embodiments, display 1200 may be a representation of a display (e.g., a physical display such as a monitor or screen of a physical computer), such as a computer-generated simulation of a physical display. In some embodiments, the computer-generated simulation of a display may be a computer-generated display area with no corresponding physical counterpart and/or representation. In these cases, the computer-generated simulation of a physical display may be a display area that may not simulate a physical display. In some implementations, the computer-generated simulation of the physical display may be superimposed upon a physical environment, or a representation thereof (e.g., as in MR implementations), such that user 202 may perceive the computer-generated simulation of the physical display superimposed over the physical environment. In other implementations, the computer-generated simulation of the physical display may be a virtual object that is part of a fully CGR environment (e.g., as in VR applications).

In some embodiments, display 1200 may represent a physical display that is presented to user 202 via electronic device 200. For example, display 1200 may include an actual physical display and may not be a computer-generated simulation of the display. In this case, as described above with respect to display 204 of FIG. 2A, display 1200 may be presented to user 202 such that user 202 may view the physical display, instead of viewing a computer-generated simulation of the physical display. In yet other embodiments, presenting the physical display to user 202 may be performed by superimposing a photorealistic image and/or video of the physical display on a simulated environment.

In aspects, display 1200 may be a curved display. In some embodiments, display 1200 may extend such that display 1200 may partially or fully surround user 202, such that user 202 may perceive display 1200 as a display surrounding him or her.

In embodiments, an input mechanism may be included to facilitate user interaction. For example, the input mechanism may include a mechanism for a user (e.g., user 202) to interact with display 1200 or with UI elements of display 1200. In embodiments, the input mechanism may include a representation of an appendage of the user (e.g., a virtual representation of a finger, hand, leg, foot, etc.), a user's gaze (e.g., head gaze, eye gaze, etc.), an input device (e.g., a mouse, stylus, pen, touch-sensitive surface, image sensors, etc.), etc. In embodiments, the representation of an appendage of the user may include a virtual representation of the appendage and/or may include data representing characteristics of the appendage (e.g., location, orientation, distance to a particular point, etc.) within the CGR environment. In aspects, the input mechanism may be detected using input sensors (e.g., touch-sensitive surfaces, image-sensors, etc.) configured to perform hand-tracking, head gaze-tracking, eye gaze-tracking, finger-tracking, etc.

In embodiments, UI elements associated with the input mechanisms may be provided. For example, as illustrated in FIG. 12A, a UI element 1210 may be provided and displayed in display 1200. In embodiments, UI element 1210 may be a cursor, an application window, etc. In this example, a current location of UI element 1210 within CGR 1290 may be location 1220. Additionally, the input mechanism may include gaze 1250 of user 202. In particular, it is noted that gaze 1250 may have a direction associated with it, and thus gaze 1250 may be directed to a particular location within CGR environment 1290.

In embodiments, a gaze, and a direction of the gaze, may be detected. For example, gaze 1250 of user 202, which may be a head gaze (e.g., the direction in which the user's head is facing), an eye gaze (e.g., the direction in which the user's eyes are looking), a combination thereof, etc., may be detected using input and/or image sensors.

Figure 12B:
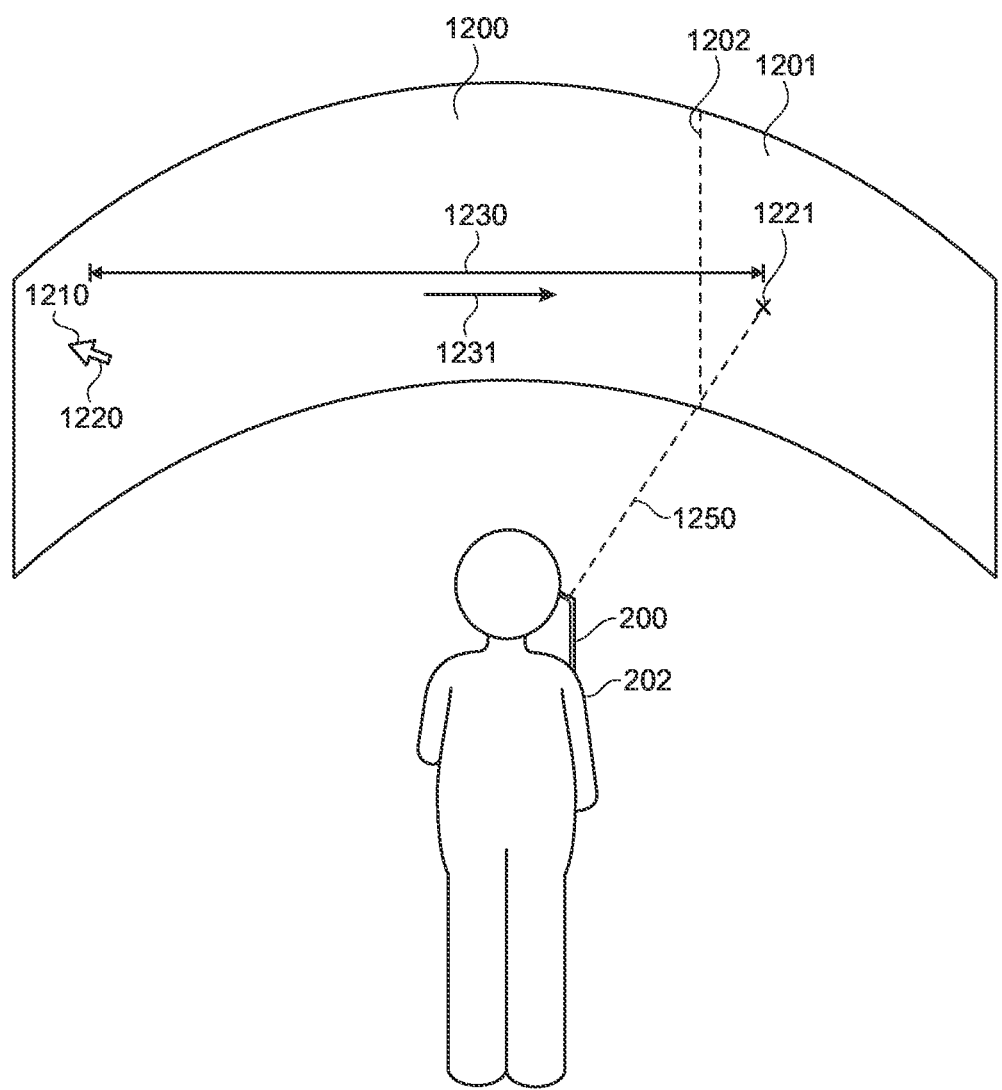

FIG. 12B shows that gaze 1250 of user 202 has moved. In particular, it is shown that gaze 1250 is directed to location 1221. Location 1221 may be a location within area 1201 of display 1200. As illustrated, area 1201 may be defined by border 1202.

In embodiments, gaze 1250, directed to location 1221 in area 1201, may be detected using input sensors and/or image sensors. As such, it may be determined that the current gaze of user 202 (e.g., gaze 1250) may be directed to location 1221, and/or directed to area 1201. Furthermore, as noted above, gaze 1250 may be a head gaze, in which case it may be determined that the user's head is directed to location 1221 and/or area 1201, or may be an eye gaze, in which case it may be determined that the user's eyes are directed to location 1221 and/or area 1201.

In embodiments, gaze 1250 may be used to determine a second location within CGR environment 1290. The second location may be a location to which UI element 1210 is to be moved. In embodiments, the second location may be a point (e.g., location 1221) or may be an area (e.g., area 1201), and may be determined based on the location at which gaze 1250 is directed. For example, as gaze 1250 is directed to location 1221 and area 1201, the second location may be determined to be location 1221 or location 1201. In some embodiments, for example, where the second location is determined to be an area, the particular location within the area at which UI element 1210 is to be moved may be a snap point. In these cases, UI element 1210 may be moved to the area (e.g., area 1201), but may be snapped to the snap location (e.g., location at which the user's gaze is directed, or a default location). In embodiments, the second location may be based on a UI element upon which the user is determined to be looking. For example, based on gaze 1250, it may be determined that user 202 may be looking at a UI element at location 1221 (e.g., a particular selectable UI element, a status UI element (e.g., a time icon, etc.), a system element (e.g., system display icon, etc.), etc.).

In some embodiments, the second location may be determined based on a dwell time of gaze 1250. For example, gaze 1250 may be detected at area 1201, and it may be determined that gaze 1250 is directed to location 1221. In this case, location 1221 may be determined to be the second location when gaze 1250 is determined to remain directed at (e.g., dwell on) location 1250 for at least a predetermined period of time. If gaze 1250 does not remain directed at location 1250 for at least the predetermined period of time, the second location is not determined.

In some embodiments, the second location may be determined based on gaze 1250 being directed to a particular UI element. For example, when gaze 1250 is directed to a particular UI element in area 1201, area 1201, or a location within area 1201 (e.g., a snap location or the location within area 1201 at which gaze 1250 may be directed) may be determined as the second location. In embodiments, a particular UI element may be provided in area 1201, where the particular UI element may be configured to indicate a request to move UI element 1210 to area 1201 and/or to the location where the particular UI element is displayed. In these cases, the particular UI element may be determined to be selected when gaze 1250 is directed to the particular UI element (e.g., for at least a predetermined amount of time), and area 1201, or a location within area 1201 (e.g., a snap location or the location of the particular UI element) may be determined as the second location.

In embodiments, determining to move UI element 1210 may be based on a request to move UI element 1210 meeting a movement criteria. For example, a request to move UI element 1210 may be received. In embodiments, a request to move UI element 1210 may include an actual movement of UI element 1210. For example, the input mechanism (e.g., a mouse, stylus, pen, touch-sensitive surface, image sensors, etc.) associated with UI element 1210, or configured to control UI element 1210, may be moved (e.g., by user 202), which may normally cause a corresponding movement of UI element 1210 within display 1200. In embodiments, the movement of the input mechanism may be determined to be a request to move UI element 1210. In embodiments, the request to move UI element 1210 may include a click and hold of an input mechanism. In embodiments, a determination may be made as to whether the request to move UI element 1210 meets the movement criteria or not.

In embodiments, the request to move UI element 1210 may be determined to meet the movement criteria when a second location has been determined based on the user's gaze (e.g., gaze 1250). In these cases, a determination of the second location may indicate that the user's gaze (e.g., gaze 1250) has been detected as directed to area 1201 and/or location 1221, detected as dwelling on a location for at least a predetermined period, and/or detected as directed at a particular element in area 1201, as described above.

In embodiments, the request to move UI element 1210 may be determined to meet the movement criteria when, additionally, the movement of the input mechanism exceeds a threshold amount of movement. For example, as shown in FIG. 12B, gaze 1250 may be directed to area 1201 and/or location 1221. In this example, an input mechanism may be moved by an input mechanism movement distance. The input mechanism movement distance may be compared against a threshold amount of movement. If the input mechanism movement distance exceeds the threshold amount of movement, the request to move UI element 1210 may be determined to meet the movement criteria. Conversely, if the input mechanism movement distance does not exceed the threshold amount of movement, the request to move UI element 1210 may be determined not to meet the movement criteria.

In embodiments, the request to move UI element 1210 may be determined to meet the movement criteria when, additionally, the movement of the input mechanism is in a particular direction. For example, as shown in FIG. 12B, gaze 1250 may be directed to area 1201 and/or location 1221. In this example, an input mechanism may be moved in direction 1231, towards area 1201 and location 1221. In this example, as the movement direction of the input mechanism is towards the location and/or area at which gaze 1250 is directed, the request to move UI element 1210 may be determined to meet the movement criteria. Conversely, if the movement direction of the input mechanism is not towards the location and/or area at which gaze 1250 is directed, the request to move UI element 1210 may be determined not to meet the movement criteria.

In embodiments, the request to move UI element 1210 may be determined to meet the movement criteria when, additionally, gaze 1250 is directed to a particular type of application. For example, gaze 1250 may be directed to an application displayed in area 1201. In this example, the input mechanism associated with UI element 1210 may be moved. If the application at which gaze 1250 is directed is of a particular type, the request to move UI element 1210 may be determined to meet the movement criteria. Conversely, if the application at which gaze 1250 is directed is not of a particular type, the request to move UI element 1210 may be determined not to meet the movement criteria.

In embodiments, when the request to move UI element 1210 is determined to meet the movement criteria, as described above, UI element 1210 may be moved to the second location. As shown in FIG. 12B, the second location may be determined to be location 1221, in accordance with the description above. As also shown, there is a distance 1230 between the current location 1220 of UI element 1210 and the second location (e.g., location 1221). Thus, in order to move UI element 1210 to location 1221, distance 1230 needs to be traversed. As will be appreciated, moving UI element 1210 from location 1220 to location 1221 may include dragging UI element 1210 across display 1200, in correspondence with the movement of the input mechanism (e.g., a mouse, stylus, pen, touch-sensitive surface, image sensors, etc.)), to the second location (e.g., location 1221). However, this dragging movement may take a long time, and in some cases, the user may lose track of where UI element 1210 is. This is particularly significant when a display in which the UI element being displayed is a large display (e.g., a display substantially or wholly surrounding a user). On the other hand, moving UI element 1210 from location 1220 to location 1221 may include teleporting UI element 1210 from location 1220 to location 1221. For example, UI element 1210 may be displayed at location 1221 while simultaneously being ceased to be displayed at location 1220. However, teleporting UI element 1210 from location 1220 to location 1221 might cause an undesirable effect, e.g., upon the sudden appearance of UI element 1210 in the new location 1221. In addition, the user may lose sight of UI element 1210 in location 1221, especially when the new location 1221 may include content being displayed, which might obscure where the UI element is to be displayed.

In embodiments, moving UI element 1210 to location 1221 may include a two-stage process. In embodiments, the two-stage process of embodiments may be configured to facilitate a user perceiving the movement of the UI element to the new location and/or area without an undesirable surprise and may render the movement of UI element 1210 to location 1221 easier to follow and perceive. In embodiments, the two-stage process may include teleporting UI element 1210 from location 1220 to a lead-in location different from location 1221, and moving (e.g., dragging) UI element from the lead-in location to location 1221.

Figure 12C:
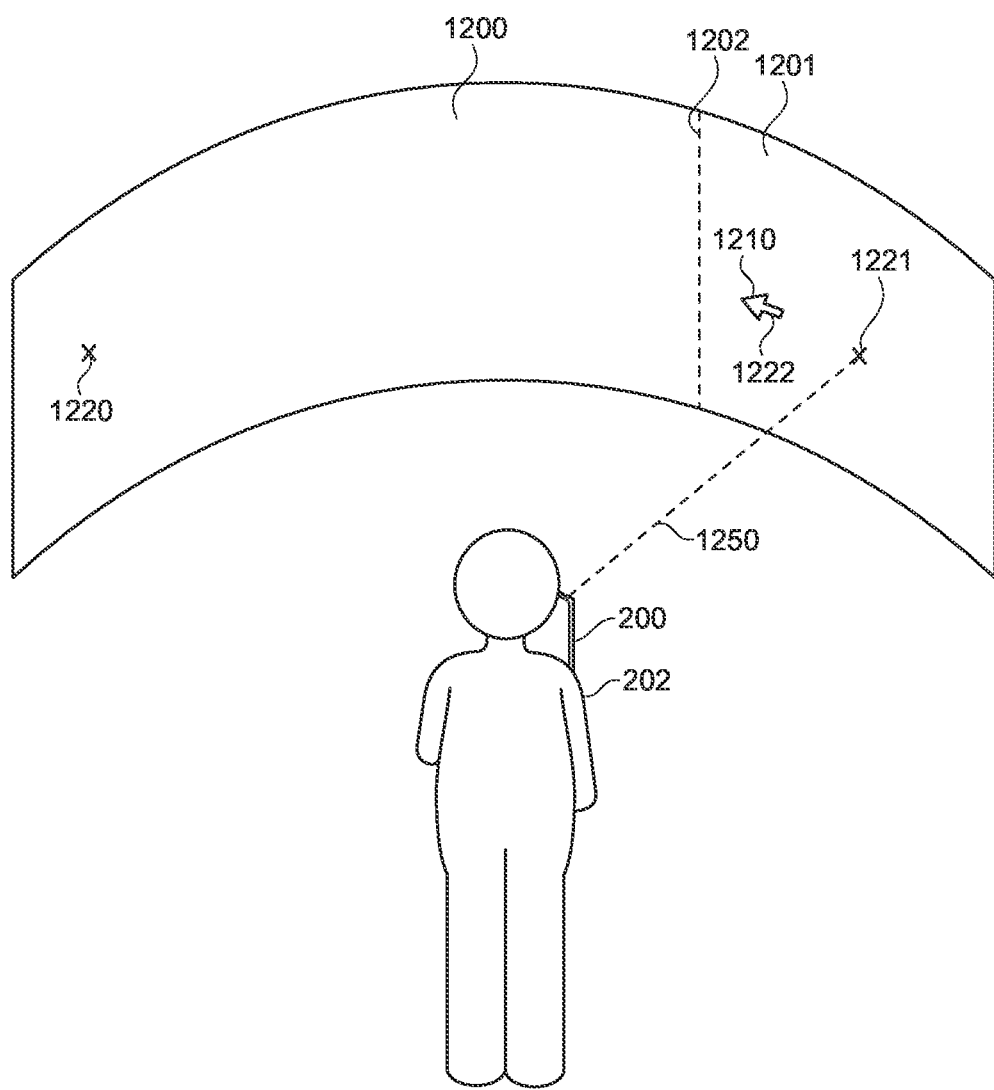

FIG. 12C shows UI element 1210 being teleported from location 1220 to lead-in location 1222. In embodiments, teleporting UI element 1210 from location 1220 to lead-in location 1222 may include displaying UI element 1210 at lead-in location 1222 while simultaneously, or near-simultaneously, ceasing to display UI element 1210 at location 1220. The effect is that UI element 1210 seems to teleport from location 1220 to location 1222.

In embodiments, lead-in location 1222 may be determined based on the second location (e.g., location 1221). For example, the lead-in location may be determined to be a location at a predetermined distance, in the direction of location 1220, from the second location. In embodiments, lead-in location 1222 may also be a location determined based on the area in which the second location is located. For example, each area of display 1200 may have a predetermined lead-in location. For example, lead-in location 1222 may be a predetermined lead-in location for area 1201.

Figure 12D:
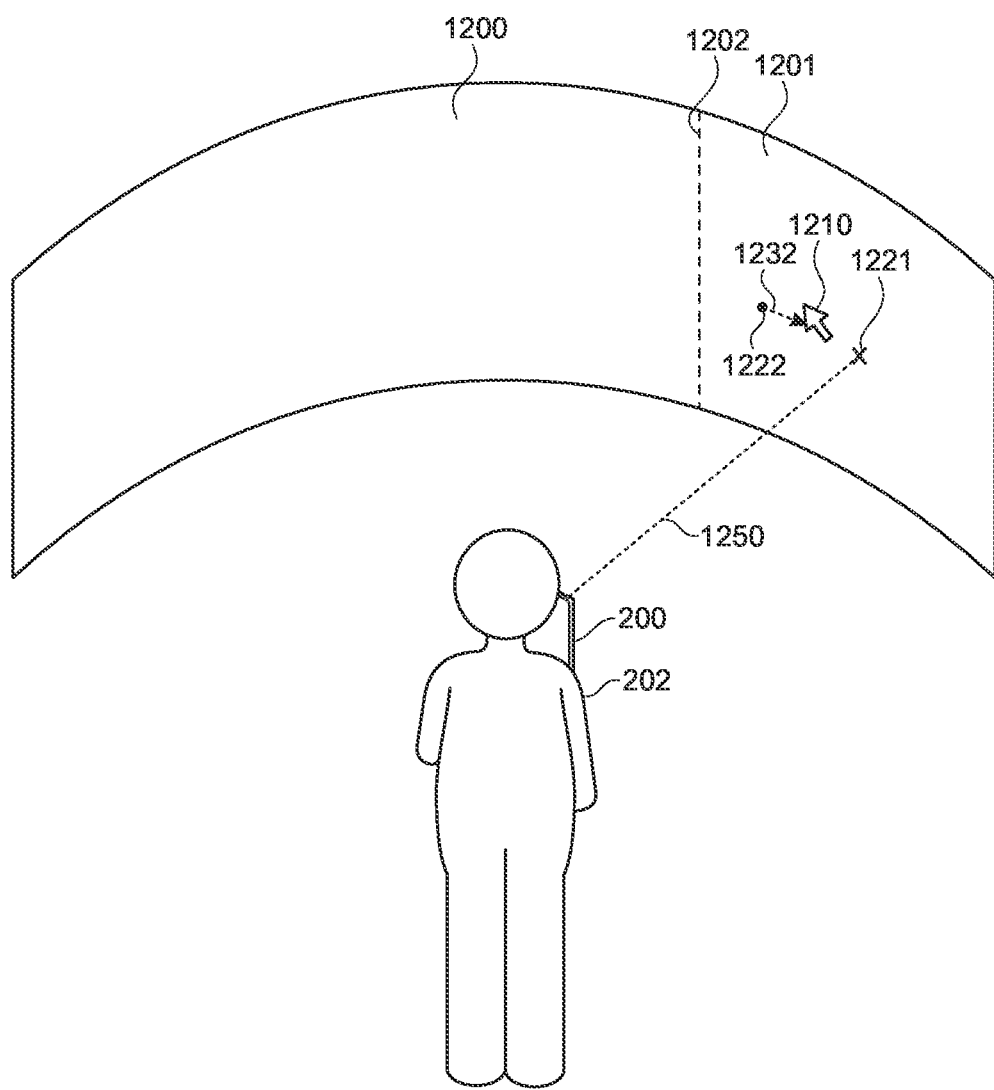
Figure 12E:
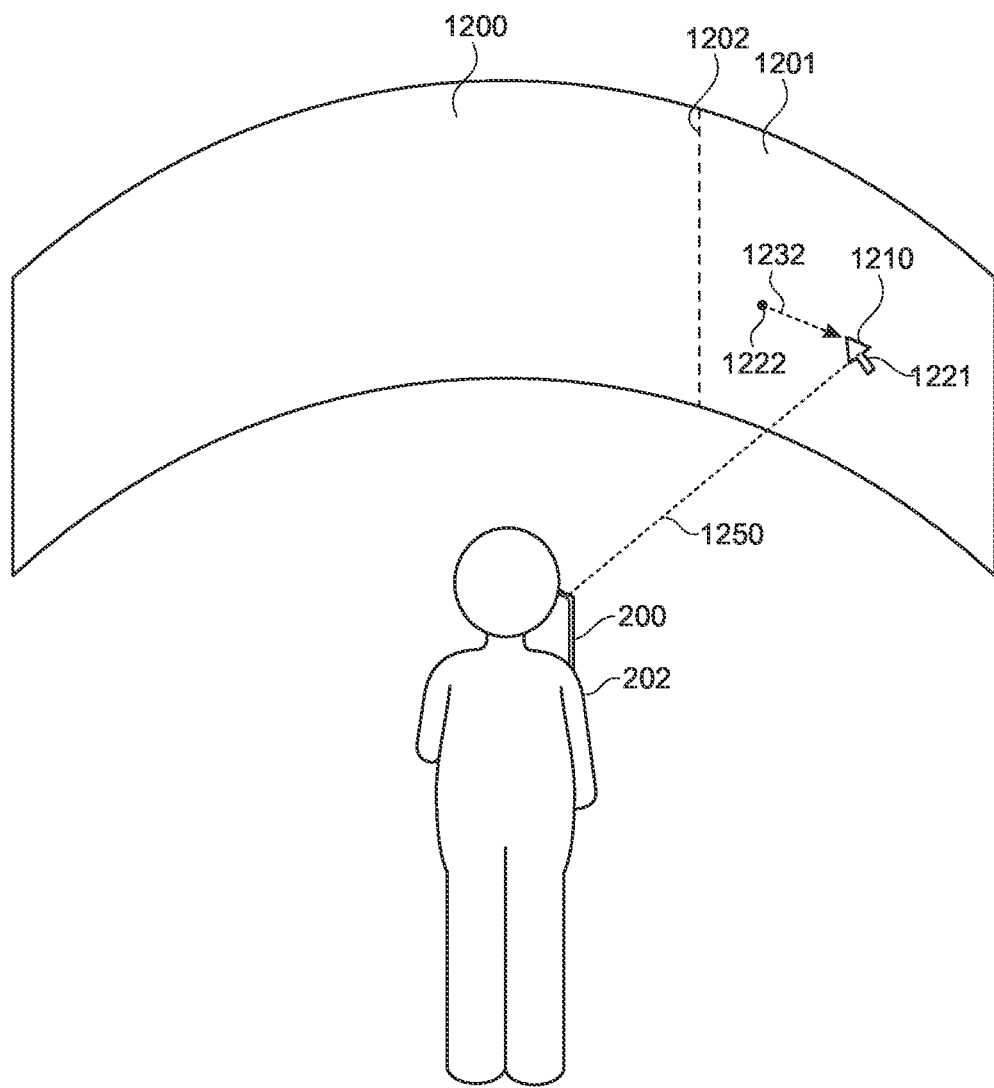

FIG. 12D shows UI element 1210 initially being moved from lead-in location 1222 to location 1221 after being teleported to lead-in location 1222 from location 1220. FIG. 12E shows UI element 1210 moved to location 1221. In embodiments, moving element 1210 from lead-in location 1222 to location 1221 may be animated, and a user may perceive that UI element 1210 moves, slides, or is otherwise dragged from lead-in location 1222 to location 1221. In some embodiments, audio may also be played as part of the animation of the moving of UI element 1210 from lead-in location 1222 to location 1221. In some embodiments, different audio may be played when UI element 1210 is teleported to lead-in location 1222 from location 1220.

Figure 13:
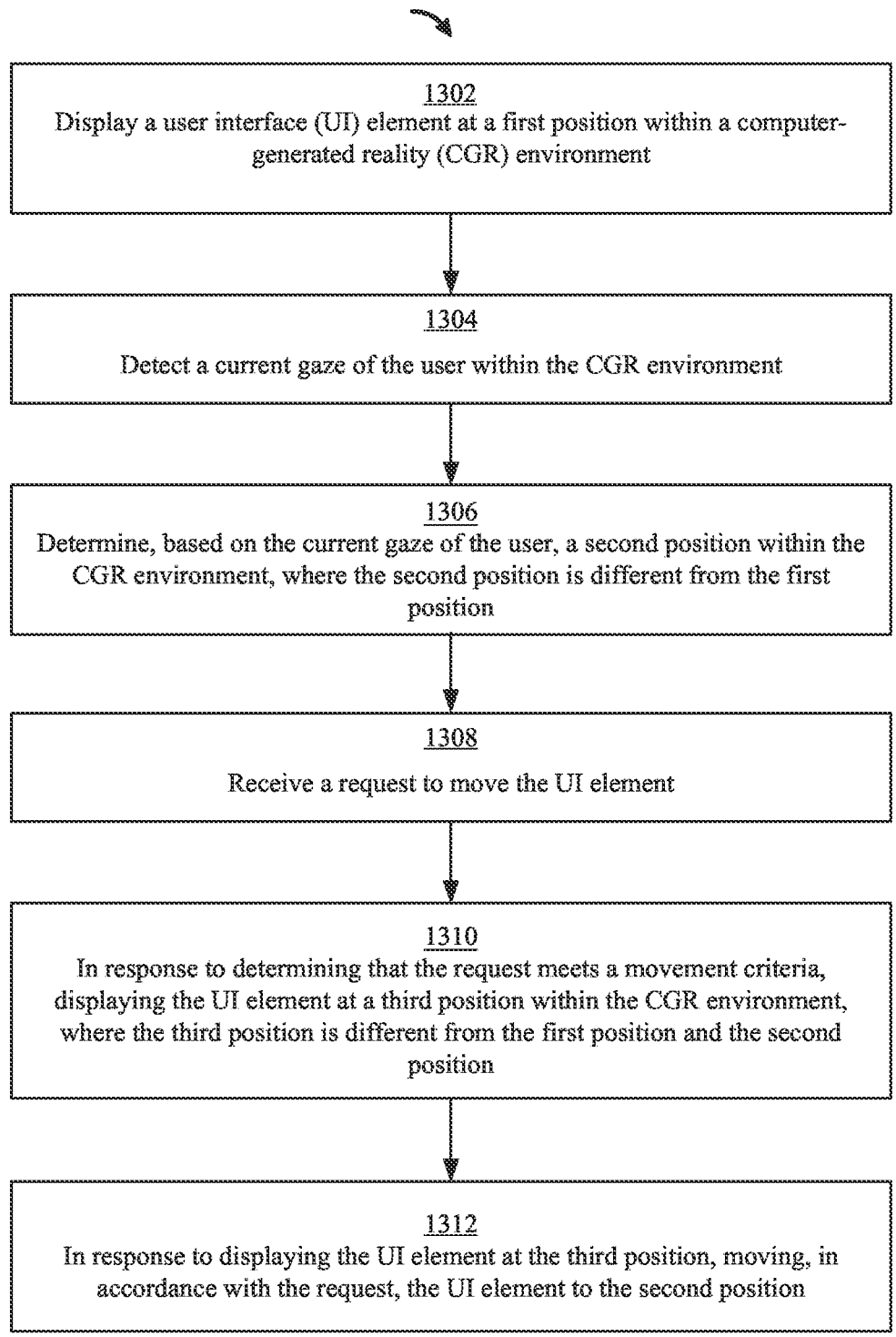
FIG. 13 is a flow diagram illustrating a method executed to implement aspects of the present disclosure.

FIG. 13 is a flow diagram illustrating method 1300 for controlling the displaying of a UI element based on a gaze within a CGR environment. In some embodiments, method 1300 may be performed by system 100 or a portion of system 100. In some embodiments, method 1300 may be performed by one or more external systems and/or devices. In some embodiments, method 1300 may be performed by system 100 (or a portion of system 100) in conjunction with one or more external systems and/or devices.

At block 1302, the system displays, via a display of an electronic device (e.g., a wearable electronic device, an HMD device, etc.), a UI element at a first position within a CGR environment. For example, a UI element may be displayed at a first position within a CGR environment via a first display (e.g., a left eye display panel) or second display (e.g., a second eye display panel) of an electronic device.

In embodiments, the first position at which the UI element is displayed may be a location within a virtual display. In embodiments, the virtual display may represent a curved display having a size such that the display may partially or fully surround a user, such that the user may perceive the display as a display surrounding him or her.

In embodiments, the UI element may be a UI element (e.g., a cursor) associated with an input mechanism (e.g., a mouse, stylus, pen, touch-sensitive surface, image sensors, etc.), and the input mechanism may be configured to control the UI element. For example, UI element may be moved based on a corresponding movement of the associated input mechanism. In embodiments, the UI element may be an application window.

At block 1304, the system detects a current gaze of the user within the CGR environment. For example, a gaze of the user may be detected using input sensors and/or image sensors. In embodiments, the gaze of the user may be head gaze, eye gaze, or a combination thereof. In embodiments, detecting the current gaze of the user may include detecting a direction to which the current gaze is directed. In embodiments, the current gaze may be determined to be directed at a particular location and/or area within the CGR environment.

At block 1306, the system determines, based on the current gaze of the user, a second position within the CGR environment. In embodiments, the second position is different from the first position. For example, the second position may be a position in a different area and/or a different location within the CGR environment than the area and/or location of the first position.

In embodiments, for example, where the second position is determined to be an area, the location within the area at which the UI element is to be moved may be a snap point. In these embodiments, the UI element may be moved to the second position (e.g., an area) and may be snapped to the snap location. In embodiments, the second position may be based on a UI element upon which the user is determined to be looking. In embodiments, the second position may be determined based on a dwell time of the gaze of the user. For example, the second position may be determined to be a location at which the gaze of the user remains directed (e.g., dwells) for at least a predetermined period of time.

At block 1308, the system receives a request to move the UI element. In embodiments, the request to move the UI element may include a movement of the input mechanism (e.g., a mouse, stylus, pen, touch-sensitive surface, image sensors, etc.) associated with the UI element. In embodiments, the request to move the UI element may be a request to move the UI element a movement distance or may be a request to move the UI element in a movement direction. In embodiments, the request to move the UI element may include a click and hold of the input mechanism (e.g., a click and hold of a mouse, stylus, etc.).

At block 1310, the system, in response to determining that the request meets a movement criteria, displays the UI element at a third position within the CGR environment. In embodiments, the third position may be different from the first position and the second position. In embodiments, the third-position may be a lead-in location, as described above, within the CGR environment.

In embodiments, displaying the UI element at the third position within the CGR environment may include teleporting the UI element from the first position to the third position. For example, displaying the UI element at the third position may include displaying the UI element at the third position while simultaneously, or near-simultaneously, ceasing to display the UI element at the first position. The effect is that the UI element seems to teleport from the first position to the third position.

In embodiments, determining that the request meets the movement criteria may include determining that the user's gaze has been detected as directed to the second position, has been detected as dwelling on the second position or a UI element in the second position for at least a predetermined period of time, and/or has been detected as directed to a particular UI element in the second position.

In embodiments, determining that the request meets the movement criteria may further include determining that the movement distance of the input mechanism exceeds a threshold amount of movement. If the input mechanism movement distance exceeds the threshold amount of movement, the request to move the UI element may be determined to meet the movement criteria. Conversely, if the input mechanism movement distance does not exceed the threshold amount of movement, the request to move the UI element may be determined not to meet the movement criteria.

In embodiments, determining that the request meets the movement criteria may further include determining that the movement direction of the input mechanism is in a particular direction. If the movement direction of the input mechanism is determined to be towards the second position, the request to move the UI element may be determined to meet the movement criteria. Conversely, if the movement direction of the input mechanism is determined to be not towards the second position, the request to move the UI element may be determined not to meet the movement criteria.

In embodiments, determining that the request meets the movement criteria may further include determining that the current gaze of the user is directed to a particular type of application. If the application at which the gaze of the user is directed is determined to be of a particular type, the request to move the UI element may be determined to meet the movement criteria. Conversely, if the application at which the gaze of the user is directed is not determined to be of the particular type, the request to move the UI element may be determined not to meet the movement criteria.

At block 1312, the system, in response to displaying the UI element at the third position, moves, in accordance with the request, the UI element to the second position. In aspects, moving the UI element from the third position to the second position may include sliding, dragging, and/or otherwise moving the UI element from the third position to the second position such that the UI element seems to move (instead of teleport) from the third position to the second position.

In embodiments, moving the UI element from the third position to the second position may include animating the move. The animation may be such that a user may perceive that the UI element 1210 slides, drags, and/or otherwise moves (instead of teleport) from the third position to the second position.

As described above, one aspect of the present technology is the gathering and use of data available from various sources to provide specialized resource management of low-power devices (e.g., HMD devices) to conserve battery life for users and to provide specialized content to users of the low-power devices. The present disclosure contemplates that, in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information, etc.), date of birth, or any other identifying or personal information.

The present disclosure recognizes that the use of such personal information data, in the present technology, can be used to the benefit of users. For example, the personal information data can be used to conserve battery life of a user's low-power device. Accordingly, for example, the use of such personal information data the system to properly manage resources to conserve battery life for the low-power devices. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of managing resources for low-powered devices, the present technology can be configured to allow users to select to "opt in" or "opt out" of participation in the collection of personal information data during registration for services or anytime thereafter. In another example, users can select not to provide eye-tracking data, such as pupil location, pupil dilation, and/or blink rate for specialized resource management. In yet another example, users can select to limit the length of time the eye-tracking data is maintained or entirely prohibit the development of a baseline eye tracking profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount and/or the specificity of data stored (e.g., collecting location data a city level rather than at an address level), controlling how data is stored (e.g., aggregating data across users), and/or other methods.

Therefore, although the present disclosure broadly covers the use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, resources of low-powered devices can be managed, and content (e.g., status updates and/or objects) can be selected and delivered to users by inferring preferences based on non-personal information data or a bare minimum amount of personal information, such as the content being requested by the device associated with a user, other non-personal information available to the system controlling the low-power device, or publicly available information.

What is claimed is:

1. A wearable electronic device, comprising:
a display;
one or more processors; and
memory storing one or more programs configured to be executed by the one or more processors, the one or more programs including instructions for:
presenting, via the display, a representation of a physical display within a computer-generated reality (CGR) environment, wherein the representation of the physical display includes a first display area;
displaying, via the display, a visual object at a first location within the first display area of the representation of the physical display;
receiving a request to move the visual object to a second location within the CGR environment; and
in response to receiving the request, displaying, via the display, an expanded display area of the representation of the physical display when the second location meets a criterion, wherein displaying the expanded display area of the representation of the physical display includes expanding the representation of the physical display from an edge of the representation of the physical display in a direction configured to accommodate displaying the visual object within the expanded display area, wherein the expanded display area includes at least a portion of the first display area and a second display area, and wherein the second display area is sized to accommodate, at least, the visual object at the second location.

2. The wearable electronic device of claim 1, wherein the representation of the physical display is one of a physical display and computer-generated simulation of the physical display.

3. The wearable electronic device of claim 1, wherein the criterion is at least one of:
the second location being within a proximity threshold of an edge of the representation of the physical display;
the second location being at least partially outside of the first display area of the representation of the physical display; and
the request to move the visual object to the second location being in a particular direction.

4. The wearable electronic device of claim 1, wherein the one or more programs further include instructions for:
animating the expanding of the representation of the physical display.

5. The wearable electronic device of claim 4, wherein animating the expanding of the representation of the physical display includes shifting the edge of the representation of the physical display in the direction configured to accommodate displaying the visual object within the expanded display area as the representation of the physical display is expanded.

6. The wearable electronic device of claim 1, wherein a size of the second display area is configured to accommodate displaying the visual object within the expanded display area.

7. The wearable electronic device of claim 1, wherein the one or more programs further include instructions for:
receiving a request to move the visual object to a third location within the CGR environment; and
in response to receiving a request to move the visual object to the third location, ceasing to display the expanded display area of the representation of the physical display, wherein ceasing to display the expanded display area includes continuing to display at least a portion of the first display area.

8. The wearable electronic device of claim 7, wherein the third location is a location within the first display area.

9. The wearable electronic device of claim 7, wherein ceasing to display the expanded display area of the representation of the physical display includes contracting the expanded display area, and wherein contracting the expanded display area includes presenting the representation of the physical display including the first display area without displaying the second display area.

10. The wearable electronic device of claim 9, wherein the one or more programs further include instructions for:
animating the contracting of the expanded display area, wherein animating the contracting of the expanded display area includes shifting an edge of the expanded display area toward the first display area as the expanded display area is contracted.

11. The wearable electronic device of claim 9, wherein the expanded display area of the representation of the physical display includes at least a curved portion.

12. The wearable electronic device of claim 11, wherein the one or more programs further include instructions for:
ceasing to display the expanded display area of the representation of the physical display, wherein the representation of the physical display retains at least a curved portion after the ceasing, wherein ceasing to display the expanded display area includes continuing to display at least a portion of the first display area.

13. The wearable electronic device of claim 1, wherein displaying the visual object within the expanded display area, wherein displaying the visual object within the expanded display area includes:
displaying at least a portion of the visual object within the first display area; and
displaying at least another portion of the visual object within the second display area.

14. The wearable electronic device of claim 1, wherein the one or more programs further include instructions for:
forgoing displaying the expanded display area of the representation of the physical display when a size of the expanded display area is determined to meet a predetermined threshold size.

15. The wearable electronic device of claim 14, wherein forgoing displaying the expanded display area includes limiting the size of the expanded display area to the predetermined threshold size.

16. The wearable electronic device of claim 1, wherein the one or more programs further include instructions for:
forgoing displaying the expanded display area of the representation of the physical display when the request to move the visual object to the second location includes a request to move the visual object toward a top or a bottom edge of the representation of the physical display.

17. A non-transitory computer-readable storage medium storing one or more programs configured to be executed by one or more processors of a wearable electronic device including a display, the one or more programs including instructions for:
presenting, via the display, a representation of a physical display within a computer-generated reality (CGR) environment, wherein the representation of the physical display includes a first display area;
displaying, via the display, a visual object at a first location within the first display area of the representation of the physical display;
receiving a request to move the visual object to a second location within the CGR environment; and
in response to receiving the request, displaying, via the display, an expanded display area of the representation of the physical display when the second location meets a criterion, wherein displaying the expanded display area of the representation of the physical display includes expanding the representation of the physical display from an edge of the representation of the physical display in a direction configured to accommodate displaying the visual object within the expanded display area, wherein the expanded display area includes at least a portion of the first display area and a second display area, and wherein the second display area is sized to accommodate, at least, the visual object at the second location.

18. The non-transitory computer-readable storage medium of claim 17, wherein the criterion is at least one of:
the second location being within a proximity threshold of an edge of the representation of the physical display;
the second location being at least partially outside of the first display area of the representation of the physical display; and
the request to move the visual object to the second location being in a particular direction.

19. The non-transitory computer-readable storage medium of claim 17, wherein the one or more programs further include instructions for:
receiving a request to move the visual object to a third location within the CGR environment; and
in response to receiving a request to move the visual object to the third location, ceasing to display the expanded display area of the representation of the physical display, wherein ceasing to display the expanded display area includes continuing to display at least a portion of the first display area.

20. A method, comprising:
presenting, via a display of a wearable electronic device, a representation of a physical display within a computer-generated reality (CGR) environment, wherein the representation of the physical display includes a first display area;
displaying, via the display of the wearable electronic device, a visual object at a first location within the first display area of the representation of the physical display;
receiving a request to move the visual object to a second location within the CGR environment; and
in response to receiving the request, displaying, via the display of the wearable electronic device, an expanded display area of the representation of the physical display when the second location meets a criterion, wherein displaying the expanded display area of the representation of the physical display includes expanding the representation of the physical display from an edge of the representation of the physical display in a direction configured to accommodate displaying the visual object within the expanded display area, wherein the expanded display area includes at least a portion of the first display area and a second display area, and wherein the second display area is sized to accommodate, at least, the visual object at the second location.

21. The method of claim 20, wherein the criterion is at least one of:
the second location being within a proximity threshold of an edge of the representation of the physical display;
the second location being at least partially outside of the first display area of the representation of the physical display; and
the request to move the visual object to the second location being in a particular direction.

22. The method of claim 20, further comprising:
receiving a request to move the visual object to a third location within the CGR environment; and
in response to receiving a request to move the visual object to the third location, ceasing to display the expanded display area of the representation of the physical display, wherein ceasing to display the expanded display area includes continuing to display at least a portion of the first display area.

* * * * *

UNITED STATES PATENT AND TRADEMARK OFFICE
CERTIFICATE OF CORRECTION

| | |
|---|---|
| PATENT NO. | : 11,521,581 B2 |
| APPLICATION NO. | : 17/397734 |
| DATED | : December 6, 2022 |
| INVENTOR(S) | : Aaron Mackay Burns et al. |

It is certified that error appears in the above-identified patent and that said Letters Patent is hereby corrected as shown below:

In the Claims

In Column 47, Line 14, Claim 13, delete "wherein displaying the visual object within the expanded display area,".

Signed and Sealed this
Thirty-first Day of January, 2023

Katherine Kelly Vidal
Director of the United States Patent and Trademark Office